(12) United States Patent
Huang

(10) Patent No.: US 10,454,728 B2
(45) Date of Patent: Oct. 22, 2019

(54) BAUD RATE MODULATING MAGNETIC STRIPE DATA TRANSMITTER, SYSTEM, AND METHOD

(71) Applicant: Samsung Electronics Co., Ltd., Suwon-si, Gyeonggi-do (KR)

(72) Inventor: Enyang Huang, Andover, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 15/811,890

(22) Filed: Nov. 14, 2017

(65) Prior Publication Data

US 2019/0149372 A1    May 16, 2019

(51) Int. Cl.
*H04L 27/01* (2006.01)
*G06Q 20/32* (2012.01)

(52) U.S. Cl.
CPC ........... *H04L 27/01* (2013.01); *G06Q 20/327* (2013.01)

(58) Field of Classification Search
CPC ....... G06K 19/06206; G06K 19/07749; G06K 7/0095; G06Q 20/341; G06Q 20/327; G06Q 20/3278; G06Q 20/352; G06Q 20/32; G06Q 20/322; G06Q 20/105; G06Q 30/0238; G06Q 20/3227; G06Q 20/34; G06Q 20/3223; G06Q 20/3555; G06Q 30/0268; G07F 7/0886; G07F 7/08; G07F 7/0893; G07F 7/0833; G07F 7/082; G07F 7/0866; G07F 7/10; H04W 4/80; H04B 5/00; H04B 5/0075; Y02D 70/166; Y02D 70/42; H04L 63/0492; H01F 38/14; H04M 1/72527; H04M 1/7253; H04M 2250/02; H04M 2250/04
See application file for complete search history.

(56) References Cited

U.S. PATENT DOCUMENTS

2006/0287964 A1* 12/2006 Brown ................... G06Q 20/26
                                                                         705/64

* cited by examiner

*Primary Examiner* — Rahel Guarino
(74) *Attorney, Agent, or Firm* — Jefferson IP Law, LLP

(57) ABSTRACT

A contactless payment device and method transmits a sequence of magnetic-field pulses directly to two or three magnetic-stripe read heads of a point-of-sale terminal. The baud rate at which the data is transmitted is modulated so that track data for one read head channel will be ignored by another read head channel, based on the change to the baud rate and/or the rate of change in the baud rate to improve acceptance of the transmitted pulses received by the read heads of the point-of-sale terminal.

20 Claims, 17 Drawing Sheets

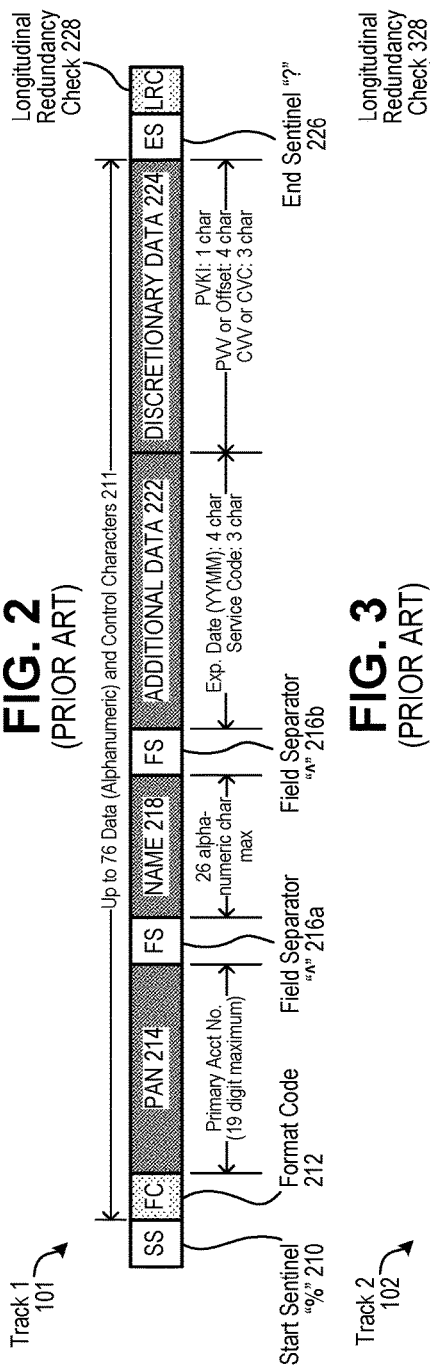
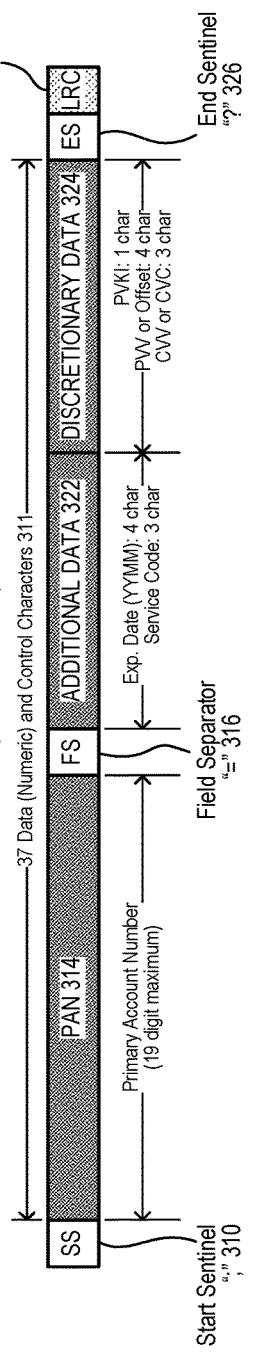
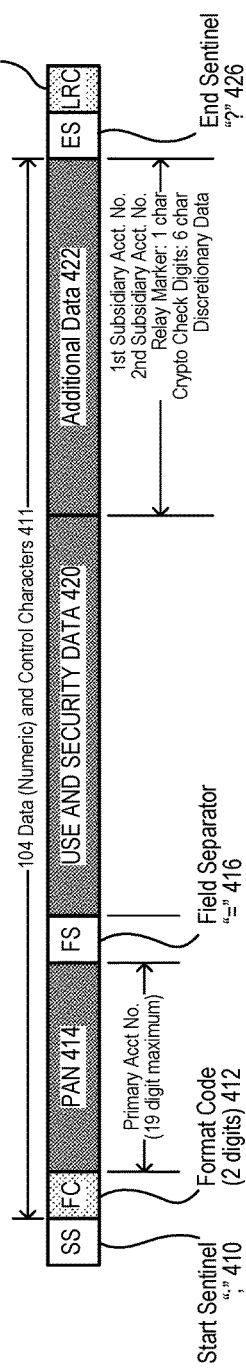
FIG. 2 (PRIOR ART)
FIG. 3 (PRIOR ART)
FIG. 4 (PRIOR ART)

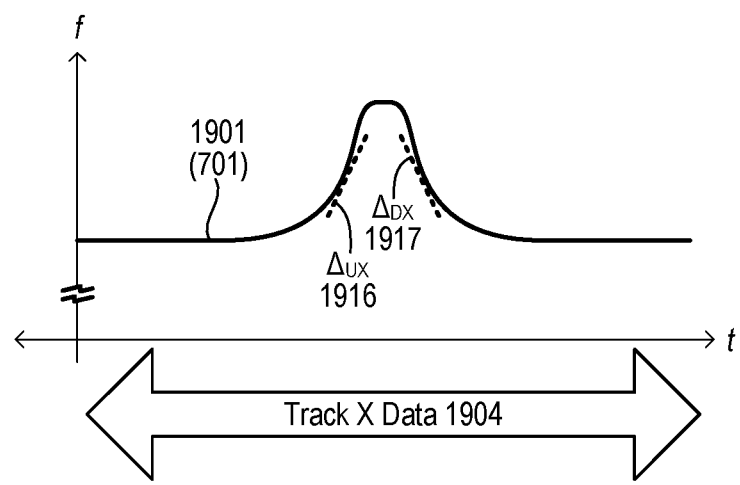
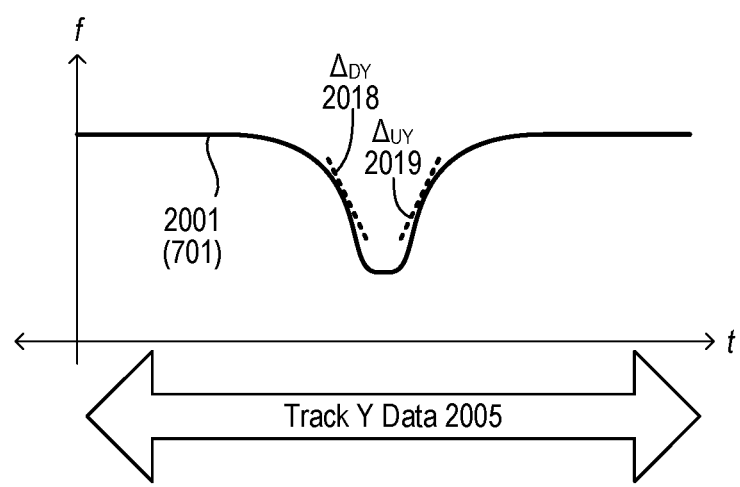

BAUD RATE MODULATING MAGNETIC STRIPE DATA TRANSMITTER, SYSTEM, AND METHOD

FIELD

The present invention relates to apparatus, systems and methods for encoding, transmitting, and validating information ordinarily stored on a magnetic stripe card.

BACKGROUND

Reading data from the magnetic stripes on credit and debit cards has primarily been performed by swiping the magnetic stripe against reader heads of a magnetic stripe reader (MSR). The data contained in the magnetic stripe is encoded in discrete tracks (channels) whose content and/or format are different. The movement of the card causes the magnetic fields produced by magnetic domains contained in the stripe to induce voltages in the MSR's read heads. A magnetic domain is a region within a magnetic material in which magnetization is in a uniform direction. In the track of a magnetic stripe card, each domain is magnetized in a direction that is parallel to the length of the magnetic stripe.

An MSR is capable of reading the data from one or more tracks/channels, and includes a read head for each channel that will be read. The MSR reads the data encoded in a track by converting a sequence of voltages induced in a channel's read head into a series of binary bits. The tracks are spaced close to each other, so each read head is precisely lined up with a corresponding track of the magnetic stripe.

The tracks of a typical magnetic stripe card 100 are described with reference to FIG. 1. As illustrated, there are three tracks of data (labeled as 101, 102, and 103), which are encoded in the magnetic stripe 11. On a standard credit/debit card, the magnetic stripe is located 0.223 inches (5.66 mm) from the edge of the card. A width 111 of each of the three tracks is 0.110 inches (2.79 mm). Each track conforms to a different encoding standard 112. The standard 112 corresponding to a track specifies the respective track's recording density 113 and character configuration 114 (in terms of bits-per-character and character type). Each track may contain a different number of characters (Information Content 115), with the maximum number of characters in each track specified in the corresponding standard 112.

The format of Track 1 101 was specified in a standard 112a developed by the International Air Transaction Association (IATA) for the automation of airline ticketing or other transactions where a reservation database is accessed. Track 1 101 typically has a recording density 113a of 210 bits per inch (8.27 bits per mm). The character configuration 114a of Track 1 101 is 7-bit alphanumeric characters. The information content 115a (including control characters) is limited to a maximum of 79 characters.

The format of Track 2 102 was specified in a standard 112b developed by the American Bankers Association (ABA) for the automation of financial transactions. Track 2 information is also used by most systems that require an identification number and other control information. Track 2 102 typically has a recording density 113b of 75 bits per inch (2.95 bits per mm). The character configuration 114b of Track 2 102 is 5-bit numeric characters (plus 5-bit control characters). The information content 115b (including control characters) is limited to a maximum of 40 characters.

The format of Track 3 103 is specified by a standard 112c developed by the Thrift-Savings industry. Track 3 103 typically has a recording density 113c of 210 bits per inch (8.27 bits per mm). The character configuration 114c of Track 3 103 is 5-bit numeric characters (plus 5-bit control characters). The information content 115c (including control characters) is limited to a maximum of 107 characters. Track 3 103 is unused by many of the major worldwide financial networks, and sometimes is not even physically present on a card, allowing for a narrower magnetic stripe. However, Track 3 103 is used in certain places, such as China, typically as an alternative to Track 2 102.

FIG. 2 illustrates an example data structure stored on Track 1 101 of a payment card. Track 101 may include the following data fields (in this order):

SS|FC|PAN|FS|Name|FS|Additional Data|Discretionary Data|ES|LRC.

The data structure of Track 1 comprises a one-character Start Sentinel (SS) 210 and a one-character End Sentinel 226, with up to 76 data characters (211) in-between. The Start Sentinel (SS) 210 and the End Sentinel 226 are "control" characters specified by the track standard 112a. The data characters 211 may also include control characters, such as characters that delimit between fields. An example of a control character included within the data sequence 211 is a Field Separator 216.

The one-character Start Sentinel (SS) 210 indicates the beginning of the data structure and consists of a "%" (percent sign) character. A one-character Format Code (FC) 212 is an alphabetic-only (A-to-Z) character and indicates the card type. A Primary Account Number (PAN) field 214 comprises the credit/debit card number, is always numerical, and contains up to 19 digits. The one-character Field Separators (FS) 216a and 216b delimit different fields and each consists of a "^" (caret) character. A Name field 218 corresponds to the name of a particular card account holder, and consists of two-to-twenty-six character alphanumeric characters. A surname separator consisting of a "/" (forward slash) character may be used to separate the card account holder's surname from their first name. If the Name field 218 is not used, it may be replaced with one upper case letter or a null (such as a blank-space character or zero) followed by a "/" (forward slash) character.

An Additional Data field 222 typically includes up to seven numbers. Four of the numbers may indicate an expiration date of the card in a YYMM format. If the date field information is not included, another field separator 216 may be included instead. Three of the numbers of the Additional Data field 222 may be a three-character service code relating to the types of charges that may be accepted. If the service code field is omitted, another field separator 216 may be included instead.

A Discretionary Data field 224 includes data used for card verification information. Examples of the discretionary data include a one-character PIN Verification Key Indicator (PVKI), a four-character PIN Verification Value (PVV) or Offset, and a three-character Card Verification Value (CVV) or Card Validation Code (CVC). The one-character End Sentinel (ES) 226 indicates an end of the data structure and consists of a "?" (question mark) character. A one-character Longitude Redundancy Check (LRC) 228 is included at the end of the data structure to provide verification that Track 1 101 was accurately read by the MSR.

FIG. 3 illustrates an example data structure stored on Track 2 102. Track 2 102 may include the following data fields (in this order):

SS|PAN|FS|Additional Data|Discretionary Data|ES|LRC.

The data structure of Track 2 comprises a one-character Start Sentinel (SS) 310 and a one-character End Sentinel 326, with up to 37 data characters (311) in-between. The Start Sentinel (SS) 310 and the End Sentinel 326 are "control" characters specified by the track standard 112b. The data characters 311 may also include control characters, such as characters that delimit between fields. An example of a control character included within the data sequence 311 is a Field Separator 316.

The one-character Start Sentinel (SS) 310 indicates the beginning of the data structure and consists of a ";" (semicolon) character. A Primary Account Number (PAN) field 314 is similar to the PAN 214 in Track 1. The PAN field 314 comprises the credit/debit card number, is always numerical, and contains up to 19 digits. The one-character Field Separator (FS) 316 consists of a "=" (equals sign) character. The Additional Data field 322 is similar to the Additional Data field 222 in Track 1 101, and may include the expiration date field and the service code field, with a Field Separator (FS) 316 substituted if a field is omitted. A Discretionary Data field 324 includes data like that described in connection with the Discretionary Data field 224 in Track 1 101. The one-character End Sentinel (ES) 326 indicates an end of the data structure and consists of a "?" (question mark) character. A one-character Longitude Redundancy Check (LRC) 328 is included at the end of the data structure to provide verification that Track 2 102 was accurately read by the MSR.

FIG. 4 illustrates an example data structure stored on Track 3 103. Track 3 103 may include the following data fields (in this order):

SS|FC|PAN|FS|Use and Security Data|Additional Data|ES|LRC.

The data structure of Track 3 comprises a one-character Start Sentinel (SS) 410 and a one-character End Sentinel 426, with up to 104 data characters (411) in-between. The Start Sentinel (SS) 410 and the End Sentinel 426 are "control" characters specified by the track standard 112c. The data characters 411 may also include control characters, such as characters that delimit between fields. An example of a control character included within the data sequence 411 is a Field Separator 416.

The one-character Start Sentinel (SS) 410 indicates the beginning of the data structure and consists of a ";" (semicolon) character. A two-digit Format Code (FC) 412 is numeric-only (00-to-99). A Primary Account Number (PAN) field 414 is similar to the PAN fields 214 and 314, containing up to 19 digits. The one-character Field Separator (FS) 416 consists of a "=" (equals sign) character. A Use and Security Data field 420 includes a variety of sub-fields related to currency types, payment limits, payment cycles, and card security. Sub-fields that are omitted may be replaced with a Field Separator (FS) 416.

An Additional Data field 422 may include fields indicating optional subsidiary account numbers, a digit relay marker field, a six digit crypto check field containing a validation value used to verify the integrity of Track 3 content, and various additional data. Field Separators (FS) 416 may be placed between subfields. Field Separators 416 may also be substituted for omitted sub-fields, such as when the crypto-check data field is omitted. The one-character End Sentinel (ES) 426 indicates an end of the data structure and consists of a "?" (question mark) character. A one-character Longitude Redundancy Check (LRC) 428 is included at the end of the data structure to provide verification that Track 3 103 was accurately read by the MSR.

FIG. 5 illustrates a typical structural arrangement of MSR read heads 500, including a Track 1 read head 501, a Track 2 read head 502, and a Track 3 read head 503. Double-head and triple-head arrangements are commonly used in Point-Of-Sale (POS) terminals to read credit and debit cards. In operation, the stripe 11 is inserted into a slot in a housing of the POS terminal (not illustrated) and is swiped in a direction parallel to the longitudinal axis 12 against the read heads 501/502/503 of an MSR component of the POS terminal.

The magnetic data in each track 101/102/103 is encoded using a Differential Manchester encoding format defined by the ISO/IEC-7811 standard. This format is known as "F2F" (frequency/double frequency), although it is sometimes referred to as "Aiken Biphase." The F2F encoding format allows the serial data stored on a track to be self-clocking. As such, the signals from the read heads can be decoded without the need for a separate "clock" signal for synchronization, allowing the MSR to differentiate between individual bits encoded in the signal. The rate at which the individual bits are transmitted and received is commonly referred to as the "baud" rate (unit symbol "Bd"), with one baud equal to one bit-per-second.

In each track of a magnetic stripe card 100, bits are encoded serially on the magnetic stripe 11 using a series of magnetic flux transitions, with the magnetic domains on opposing sides of each transition having an opposite orientation of polarity relative to the other. Modeled as bar magnets, the domains alternate between south-to-north and north-to-south orientations, aligned in the direction that the card 100 will be swiped (that is, in a direction parallel to axis 12, as illustrated in FIG. 1). Each bit of data on a track has a fixed physical length on the magnetic stripe 11. Flux transitions are located at the edge of each "0" and "1" bit, and also in the center of each "1" bit.

As the magnetic stripe 11 passes by the read heads 501/502/503, the reversal of magnetic polarity at the transition from one domain to the next causes an electric current to be induced in the adjacent read head. The first read head 501 is used to read the data stored in Track 1 101, the second read head 502 is used to read the data stored in Track 2 102, and the third read head 503 is used to read the data stored in Track 3 103. Software typically installed in the POS terminal processes the data received from the MSR. Depending upon the depth of the slot and the spacing between the heads 501/502/503, MSRs can be configured to read all three tracks or particular track combinations, such as reading Track 1 101 and Track 2 102, or reading Track 1 101 and Track 3 103, or reading Track 2 102 and Track 3 103. In POS terminals configured to read only two tracks, it is unnecessary for the MSR to include the read head and associated circuitry needed to read the unread track.

As a track 101/102/103 passes a respective magnetic read head 501/502/503, the flux transitions for that channel are converted into a series of alternating positive and negative pulses in the MSR. The transitions where the "north" poles of two domains meet will produce a positive pulse in the corresponding read head. Likewise, the transitions where two "south" poles meet will produce a negative pulse in the corresponding read head.

A binary 0 is encoded using a single magnetic domain, while a binary 1 is encoded using two smaller magnetic domains. After determining which flux transitions represent the edges of a bit, ones and zeros can be differentiated by the presence or absence of a transition in the center of the bit. The polarity of the transitions is arbitrary, since only the relative space between the transitions implies a binary 1 or a binary 0. Spatially, each of the two magnetic domains used to encode a binary 1 has one-half the physical length (in the direction the card is swiped) of a magnetic domain used to encode a binary 0, such that the physical space required to represent a binary 0 and a binary 1 in a track is the same.

Although the spacing of the bits in each respective track 101/102/103 is uniform, MSRs can tolerate variation in baud rate. That tolerance is built into the hardware and software of MSRs to accommodate variations in the speed at which a stripe 11 may be swiped across the read heads 501/502/503. Different people may swipe cards 100 at different speeds, and the speed of a swipe may vary over the duration of a single swipe.

MSRs are also configured to recognize track data received in a forward direction, and to recognize track data received in a backward "reverse" direction. In the forward direction, the bits corresponding to the start sentinel 210/310/410 of a respective channel are received by the MSR before the bits corresponding to the end sentinel 210/310/410 for that channel. In the backward direction, an entirety of the bits constituting a track are received in a reversed order. This arrangement accommodates a "double swipe," where a person pushes/pulls the stripe 11 along the read heads in one direction, and then without re-orienting the card, pulls/pushes the card back across the read heads in the reverse direction.

Disadvantageously, the data on the magnetic stripe 11 of a conventional credit or debit card is static and subject to copying and fraud. In recent years, to reduce the fraud associated with static magnetic stripe cards, electronic cards and contactless payment methods have been developed. Electronic cards and contactless methods allow the data that is provided to a POS terminal to be dynamically modified, making such approaches less susceptible to copying fraud than conventional magnetic stripe payment cards.

Electronic cards are inserted into the slot in the housing of a POS terminal and swiped along the read heads of an MSR in the same manner as a conventional magnetic stripe card 100. Electronic cards include a series of inductors arranged along a portion of at least one of the tracks 101/102/103 to simulate magnetic domains. An electronic card may include a track having both static and dynamic segments, with conventional magnetic stripe material used for the static portions, and the series of inductors providing the dynamic portions.

Since F2F requires two magnetic domains to encode a binary one, the electronic card must provide two inductors in series for each bit of simulated track data. For example, to dynamically simulate ten F2F-encoded bits, the simulated portion of the track must include twenty inductors. For each binary 0 bit, the two inductors corresponding to a bit will be configured to produce a same orientation of magnetic polarity (for example, S-N and S-N), thereby simulating a single domain. For each binary 1 bit, the two inductors corresponding to the bit will be configured to produce opposite magnetic polarities (for example, S-N and N-S), thereby simulating two domains with a signal-inducing transition in-between.

An example of a contactless payment method uses Near-Field Communications (NFC). NFC employs electromagnetic induction between a loop antenna in a handheld device and a loop antenna in a POS terminal to bidirectionally exchange information back-and-forth between the handheld device and the POS terminal. NFC operates at radio frequencies, using the globally available unlicensed radio frequency ISM band of 13.56 MHz, and transferring information at higher data rates than is possible with swiped magnetic stripe cards 100 and electronic cards. In order to be compatible with contactless methods like NFC, each POS terminals must include the needed loop antenna and receiver.

Another example of a contactless method uses an inductive loop to interact directly with the magnetic read heads (e.g., 501, 502, and 503) of the MSR. Unlike the dynamic segments of electronic cards, a single inductive loop is all that is required to simulate the entire magnetic stripe 11. Unlike the bidirectional communication used by NFC payment systems, this approach to communication with the POS terminal is limited to transmission in only one direction: from the handheld device to the POS terminal via the magnetic read heads.

An advantage of transmitting data directly to the magnetic read heads is that the POS terminal does not require any special capabilities, making the system compatible with most any POS terminals that includes a legacy MSR. For example, a POS terminal is not required to have a Near-Field Communication (NFC) receiver. Instead, a magnetic-stripe-simulating device is held in close proximity to the MSR of a POS terminal and emits a sequence of magnetic pulses from the inductive loop. While proximity between the simulating device and receiving read heads may be close, no contact is required between the simulating device and the MSR, and nothing is physically swiped by the read heads.

Instead, the simulating device generates a magnetic pulse sequence by applying a time-modulated alternating current to an inductive loop. The fluctuating magnetic field generated by the inductive loop in response to the alternating current is used to transfer F2F-encoded bits to the MSR. The data rate that is used is commensurate with a data rate that would occur if swiping a conventional magnetic stripe card across the read heads. Each reversal of the polarity of the bipolar current causes the magnetic field emitted by the inductive loop to reverse polarity The time-varying magnetic flux induces a signal in the read heads (e.g., 501, 502, and 503) similar to that caused by the transitions between magnetic domains that would occur when swiping a conventional card track 11. Typically, the inductive loop needs to be within approximately three inches (7.6 cm) of the read heads 500. The field generated by the loop dissipates rapidly beyond that point, which helps prevent the pulse sequence from being picked up by eavesdropping devices (as may not be the case with NFC transmission devices using radio frequency transmissions).

With conventional magnetic stripes, the fields generated by the magnetic domains that correspond to the data in each track/channel are narrow and confined to the reading aperture of the corresponding channel's read-head. For example, the influence of the field generated by Track 1 101 is confined to the first track read head 501, and the field generated by Track 2 102 is confined to the second track read head 502.

In comparison, the electronically-generated magnetic fields produced by the inductor(s) in magnetic stripe simulating devices may be wider than those produced by conventional magnetic stripes, resulting in the magnetic fields corresponding to a channel being picked up by the read head(s) of adjacent track(s). This problem is referred to as cross-channel "leakage." Because the different tracks' data are formatted differently, are mutually incompatible, and/or contain different content payloads, the leakage of a specific track's magnetic fields into an adjacent track's read head can cause reading errors.

For example, if the magnetic field sequence corresponding to the higher density seven-bit characters of Track 1 101 leaks into the Track 2 read head 502, the data parsing software that was expecting the five-bit characters of Track 2 102 may indicate an error. Conversely, when Track 2 102 data leaks into Track 1 read head 501, the encoded data and the LRC may be incorrectly decoded. Because of the close proximity of the tracks in a standard card stripe 11 and because of a lack of standardization among card readers, it is difficult to prevent the cross-channel leakage.

Another example of cross-channel leakage is a conflict that can arise between Track 2 102 and Track 3 103, which both use five-bits per character, the same control characters, and include a Primary Account Number, but have different data densities and otherwise carry different payloads. Due to similarities between the Track 2 and Track 3 formats, some POS terminals may implement additional logic to check to see if the data output by the Track 2 and Track 3 decoders are equal, and return an error if "T2==T3" is true.

Cross-channel leakage may be particularly problematic for magnetic stripe transmission devices that apply a time-modulated current to a single inductive loop to interact directly with multiple magnetic read heads, since the emitted field necessarily interacts with more than one read head. While the POS terminal decoder software is designed to accommodate relatively minor track noise, such as the noise generated by scratches and small defects in the magnetic stripe 11, the decoder software can be easily overwhelmed by the substantial errors caused by cross-channel leakage. Unable to handle these exception conditions, the POS terminal will terminate the transaction.

Ideally, the decoders in the MSR are able to differentiate between channel data. One way a channel decoder may accomplish this task is by buffering the signal received from a read head, and processing the buffered data to detect an occurrence of the forward-or-backward bit patterns of a control character (e.g., the start sentinel, the end sentinel, or both). Errors can occur for a variety of reasons, such as when a decoder misidentifies a bit pattern. For example, a Track 2 decoder might detect five sequential bits that correspond to the Track 2 Start Sentinel 310, but the bits are actually part of a seven bit character in the Track 1 payload 211. Intra-channel errors can also occur at the MSR, such as clock-or-bit reconstruction errors. The decoder experiencing the errors may time-out or experience buffer overflow, missing the correct data in the stream.

SUMMARY

This disclosure relates generally to an improved contact-less payment process and associated hardware that transmits track data for two-or-more magnetic stripe tracks as a sequence of magnetic-field pulses from the inductor of a magnetic-stripe-simulating device directly to the read heads (e.g., 501, 502, and 503) of a POS terminal. The improved process and apparatus is implemented to overcome cross-channel leakage problems and provide a higher degree of reliability, increasing the likelihood of the POS terminal correctly reading the pulse transmissions, and increasing the reliability and efficacy of magnetic-stripe-simulating devices.

In order to communicate data for multiple channels using a single magnetic pulse stream, data encoded for different channels may be arranged serially within the stream according to the hardware and process (method) of the disclosure. The data for a respective channel may be arranged within the single stream in either the forward or reverse bit-order, and the data for a channel may be included in the stream more than once. For example, a "T2-T1R" stream includes Track 2 102 data arranged in forward bit-order, followed by Track 1 101 data arranged in reverse bit-order (as denoted by the "R"). As another example, a "T2-T1R-T2R" stream includes Track 2 102 data arranged in forward bit-order, followed by Track 1 101 data arranged in reverse bit-order, followed by a second copy of Track 2 102 data arranged in reverse bit-order.

A stream may have "null" data inserted in the stream for a secondary channel. The "null" data conforms to a standard 112, but omits meaningful information for the channel (e.g., substituting one-or-more zeros for the contents of the track fields). The insertion of "null" data is useful when communicating with POS terminals that require secondary track data in order to process a transaction, but never actually verify the contents of the "null" secondary track (such as when a merchant's system requires the inclusion of secondary track data for data mining and marketing purposes, but never actually verifies that secondary data). For example, a T1N-T2 stream can have null data inserted in the format specified by the Track 1 standard 112*a* in forward bit-order (as denoted by the "N"), and Track 2 data 102 in the forward bit-order. As another example, a "T2-T1NR" stream can be comprised of Track 2 102 data inserted in forward bit-order, followed by null data in the format specified by the Track 1 standard 112*a* in reverse bit-order.

Abbreviated or proxy versions of a secondary track format can also be inserted in the single stream according to the hardware and process of the disclosure. Abbreviated versions are configured to conform to the track standard, but omit a portion of the conventional track data (e.g., substituting one-or-more zeros or a field separator for omitted data). Proxy versions of secondary track data may include start and end sentinels and an LRC character in either forward or reverse bit-order, but the payload bit-sequence (e.g., 211, 311, 411) may depart from the track standard 112.

Other data may be inserted into the magnetic pulse stream in order to increase the likelihood that POS terminal will properly process the track data, such as including F2F-encoded binary zeros prior to and/or after the data for a channel. The F2F-encoded zeros are emitted at the same baud rate as that of the time-adjacent track data. The binary zeros serve as clocking bits to improve the synchronization of the MSR with the channel data.

The success or failure of a stream format may vary from POS-terminal to POS-terminal. A magnetic-stripe-simulating device can be configured according to the disclosure to try a different stream format if an initial attempt fails, such as when a device user presses the "pay" button more than once within a threshold amount of time (indicating a likelihood that the prior stream transmission was rejected by the POS terminal). The magnetic-stipe-simulating device may select formats based on, among other things, a hierarchical table of formats and the geographic/regional location in which the transaction is being performed.

The successful reception of a multi-channel serial stream transmission depends in part on each decoder in the MSR correctly detecting bits in the stream for that decoder's channel, while ignoring the bits corresponding to other channels. Since all of the read heads receive all of the bits for all of the channels, the deluge of pulses can easily exceed a decoder's ability to handle cross-channel leakage, which will cause a transaction to fail.

The new hardware and process according to the disclosure individually modulates the transmission baud rate of the data for each channel to improve reception of multi-channel streams. The baud rates are modulated to leverage differences in the analog-signal handling characteristics between channels in conventional MSRs. By manipulating the transmission baud rate and the rate of change in the baud rate, the data for a first channel can be made more likely to appear as noise to a second receiver channel, or to be substantially filtered out prior decoding.

BRIEF DESCRIPTION OF THE DRAWINGS

FIG. 2 illustrates a structure of the data encoded on the first track of the magnetic stripe of FIG. 1 in accordance with existing industry standards.

FIG. 3 illustrates a structure of the data encoded on the second track of the magnetic stripe of FIG. 1 in accordance with existing industry standards.

FIG. 4 illustrates a structure of the data encoded on the third track of the magnetic stripe of FIG. 1 in accordance with existing industry standards.

FIGS. 19 and 20 illustrate examples of how the rate of change in the baud rate according to the system, process, and apparatus of the disclosure may be used to differentiate channels.

DETAILED DESCRIPTION

Figure 1:
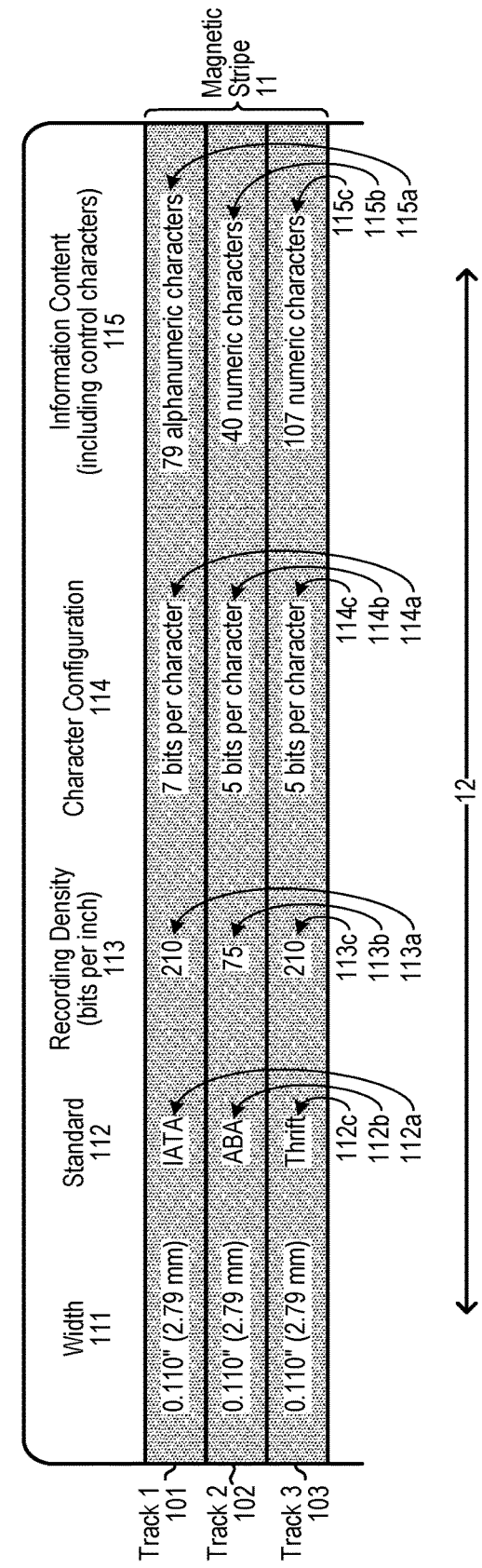
FIG. 1 illustrates a typical magnetic stripe and its tracks in accordance with existing industry standards.
Figure 5:
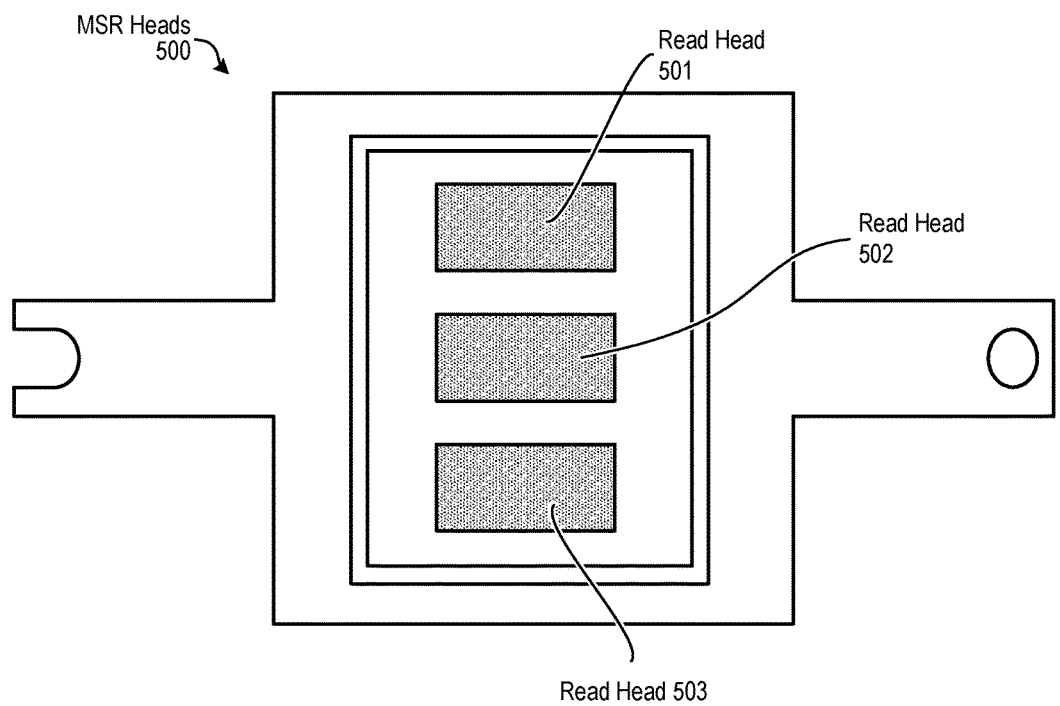
FIG. 5 illustrates a structural arrangement of a magnetic stripe reader (MSR) including three read heads, as used with or included in point-of-sale (POS) terminals.
Figure 6:
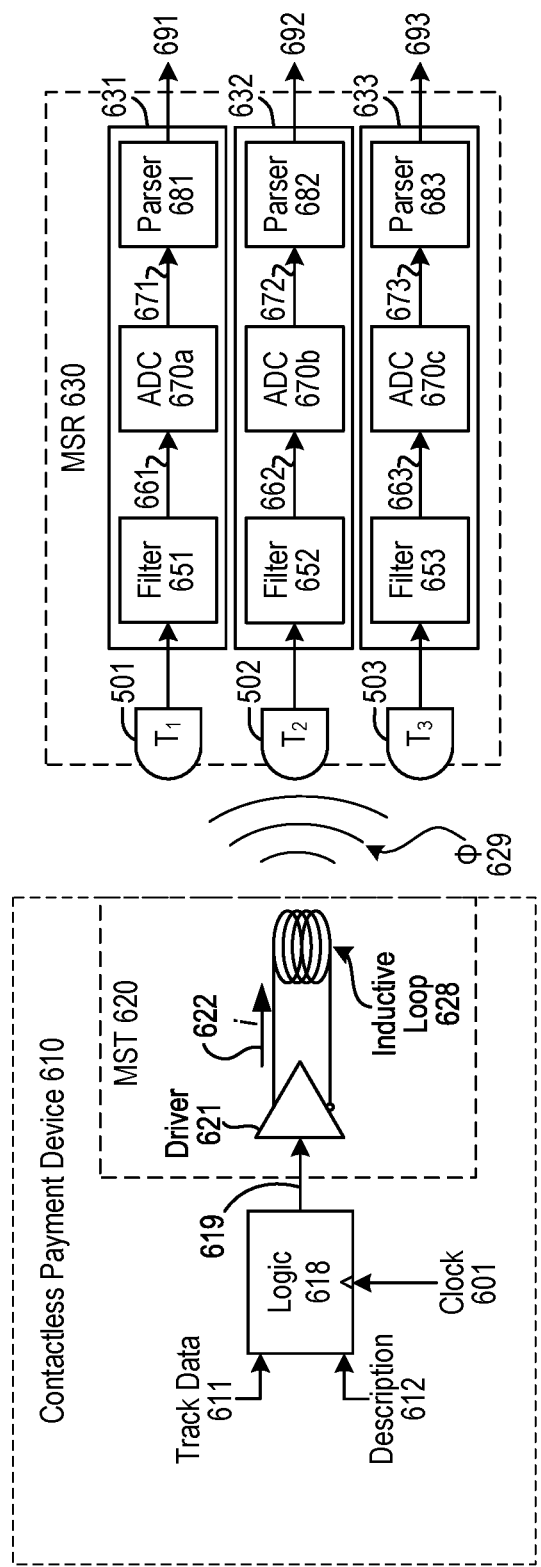
FIG. 6 is a block diagram illustrating the inductive coupling of an improved magnetic pulse transmitter according to the disclosure, transmitting to a conventional MSR.

FIG. 6 is a block diagram illustrating the inductive coupling of an improved contactless payment device 610 ("transmitter") to a conventional MSR 630. The transmitter 610 includes a logic circuit 618 and an MST (Magnetic Secure Transmission) device 620. A driver 621 in the MST device 620 receives an electrical signal over a connection 619 from the logic circuit 618 comprising F2F-encoded pulses. Based on the encoded pulses, the driver 621 outputs current pulses 622 to an inductive loop 628, causing emission of a magnetic flux Φ (phi) 629. The alternating polarity of the magnetic flux Φ 629 is used to transmit magnetic stripe information from the transmitter 610 to an MSR 630 of a POS terminal.

The MSR 630 is configured to receive information from two or three tracks 101/102/103 when a magnetic stripe 11 is swiped across the corresponding magnetic read heads 501/502/503 in a conventional manner. However, as illustrated in FIG. 6, instead of a card swipe across the read heads 500, the read heads 500 instead receive the magnet flux Φ 629 from the transmitter 610.

The Track 1 read head 501 outputs an electrical signal, based on the magnet flux Φ 629 coupled to the read head 501, to a Track 1 decoder 631. The Track 2 read head 502 outputs an electrical signal, based on the magnet flux Φ 629 coupled to the read head 502, to a Track 2 decoder 632. The Track 3 read head 503 outputs an electrical signal, based on the magnet flux Φ 629 coupled to the read head 503, to a Track 3 decoder 633.

In response to the Track 1 decoder 631 detecting Track 1 101 data in the received stream of pulses from the read head 501, the Track 1 decoder 631 decodes the pulses to identify 7-bit characters (in accordance with character configuration 114a), and outputs decoded Track 1 data 691 to the POS terminal.

In response to the Track 2 decoder 632 detecting Track 2 102 data in the received stream of pulses from the read head 502, the Track 2 decoder 632 decodes the pulses to identify 5-bit characters (in accordance with character configuration 114b), and outputs decoded Track 2 data 692 to the POS terminal.

In response to the Track 3 decoder 633 detecting Track 3 103 data in the received stream of pulses from the read head 503, the Track 3 decoder 633 decodes the pulses to identify 5-bit characters (in accordance with character configuration 114c), and outputs decoded Track 3 data 693 to the POS terminal.

In order for this to work with a serial multi-channel magnetic pulse stream from the device 610, the MSR decoders must successfully detect data for their respective channel in the stream. To facilitate successful processing by the MSR 630, existing techniques have focused on the arrangement of track data in the serial magnetic pulse stream, and the digital content included within the track data itself. Also, Track 2 data might be transmitted in the stream at a lower baud rate than Track 1 and/or Track 3, so as to simulate the difference in baud rate that would occur during the swipe of a magnetic card stripe 11, since the recording density 113b associated with the Track 2 102 is less than the recording densities 113a/113c associated with Track 1 101 and Track 3 103. However, changes in baud rate within the serial stream were designed to make track data more susceptible to detection by a corresponding track decoder, rather than to decrease the susceptibility of detection of the data to the other track decoder(s).

The device 610 leverages differences in analog-signal handling between MSR channels in order to make serial data intended for a first track decoder appear as noise to a second channel's decoder. The device 610 modulates the baud rate within a portion of the stream corresponding to a first track. The baud rate modulation and/or the rate of change of baud rate modulation is designed to be within the analog-signal handling tolerances of the intended decoder, while being incompatible with the analog-signal handling tolerances of one-or-both of the other decoders. The transmission baud rate and relevant thresholds depend in-part on how track data is arranged in the serial pulse stream, but are also manipulated or compensated for as a function of parameters associated with an MSR 630 of a particular POS terminal or terminal type. Parameter-based threshold include those based on the frequency response of each channel decoder of an MSR, a channel decoder's tolerance for the rate of change in the transmission baud rate, and a channel decoder's card-present timeout threshold.

The inner-workings and tolerances of MSRs 630 generally vary from manufacturer-to-manufacturer and from model-to-model, but based on experimental sampling, certain analog-signal handling characteristics and principles of operation can be generalized. The representations of the inner-workings of the decoders 631/632/633 in FIG. 6 are models based on such generalization.

The Track 1 decoder 631 includes a low-pass or bandpass filter 651, that receives the electrical signal output by the Track 1 read head 501 as input, and outputs a filtered signal 661. The filtered signal 661 is input into an analog-to-digital converter (ADC) 670a, producing a digital representation 671 of the filtered signal 661. The digital representation 671 is input into a Track 1 parser 681 which identifies pulses in the digital representation 671 of the filtered signal 661, determines the embedded clock rate, decodes the F2F encoding, and parses decoded bits to produce the Track 1 data 691 as a string or strings of alphanumeric characters (e.g., alphanumeric corresponding to those from Track 1 payload 211).

The Track 2 decoder 632 includes a low-pass or bandpass filter 652, that receives the electrical signal output by the Track 2 read head 502 as input, and outputs a filtered signal 662. The filtered signal 662 is input into an ADC 670b, producing a digital representation 672 of the filtered signal 662. The digital representation 672 is input into a Track 2 parser 682 which identifies pulses in the digital representation 672 of the filtered signal 662, determines the embedded clock rate, decodes the F2F encoding, and parses decoded bits to produce the Track 2 data 692 as a string or strings of numeric characters (e.g., numeric corresponding to those from Track 2 payload 311).

The Track 3 decoder 633 includes a low-pass or bandpass filter 653, that receives the electrical signal output by the Track 3 read head 503 as input, and outputs a filtered signal 663. The filtered signal 663 is input into an ADC 670c, producing a digital representation 673 of the filtered signal 663. The digital representation 673 is input into a Track 3 parser 683 which identifies pulses in the digital representation 673 of the filtered signal 663, determines the embedded clock rate, decodes the F2F encoding, and parses decoded bits to produce the Track 3 data 693 as a string or strings of numeric characters (e.g., numeric corresponding to those from Track 3 payload 411).

Based on test payment transactions with a variety of different MSRs, the signal-response characteristics of read heads 501/502/503 and/or the filters 651/652/653 vary between channels, the parsers 681/682/683 have different tolerances for the rate of change in the baud rate of the stream, and the parsers have different tolerances for the gaps between received data bursts. While the signal-response characteristics and tolerances vary from MSR-to-MSR, there are some commonalities that can be leveraged to improve the likelihood that each channel will receive its intended track-specific data and ignore the data specific to other tracks, without exceeding the limits of a decoder's noise tolerance (causing a transaction to fail).

The transmitter 610 includes a logic circuit 618 that modulates the baud rate at which encoded bits are transmitted to the MSR 630. The logic circuit 618 receives track data 611, and also receives description data 612 indicating the baud rate at which the track data 611 should be transmitted. The logic circuit 618 also receives a clock signal 601 that has a higher frequency than the baud rate that the track data 611 will be transmitted. The logic circuit 618 outputs an F2F-encoded version of the track data 611 over the connection 619 at the data rate specified by the description data 612.

Figure 7:
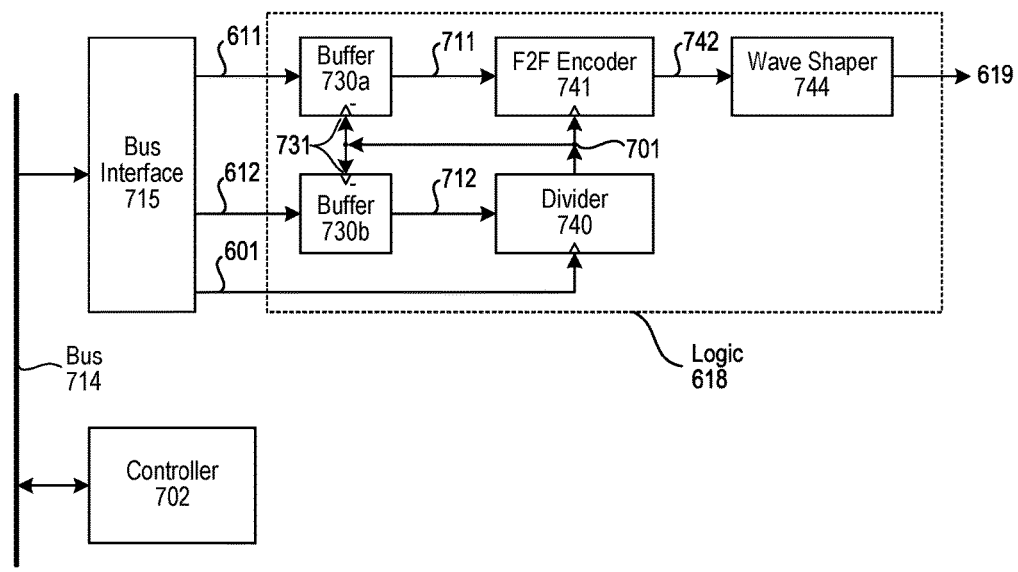
FIG. 7 is a block diagram illustrating an example of the transmitter's logic component in FIG. 6.

FIG. 7 is a block diagram illustrating an example of the transmitter's logic circuit 618 from FIG. 6. As illustrated, a bus interface 715 of the transmitter 610 provides the input signals to the logic circuit 618, including the track data 611, the description data 612, and the clock signal 601. The bus interface 715 may be used to connect the logic circuit 618 to a bus or busses 714, including one-or-more parallel busses, serial-busses, or a combination thereof. For example, the bus 714 may be a two-line I$^2$C (Inter-Integrated Circuit) serial bus, with the track data 611 and the description data 612 being received over an I$^2$C bus Serial Data Line (SDA) and the clock signal 601 being based on the I$^2$C bus Serial Clock Line (SCL).

As alternatives, the logic circuit 618 may be connected directly to a controller 702 providing the data stream, or partially or entirely integrated into the controller 702 (either as software, hardware, or a combination thereof).

The logic circuit 618 includes a data buffer 730 that is configured as a First-In-First-Out (FIFO) data queue. The data buffer 730 includes a section 730a for storing a series of bits corresponding to the track data 611 and a section 730b for storing the description data 612. The bus interface 715 receives the track data 611 bits and the description data 612 from the controller 702 via the bus 714, and loads the buffer 730 so track data 611 bits and the description data 612 corresponding to that track data 611 will be dequeued in parallel.

Data is enqueued (loaded/written) into the "back" of the FIFO queue, and dequeued (read) from the "front" of the queue. The description data 712 at the front of the buffer 730b queue is output to a control input of a programmable digital frequency divider 740. Frequency dividers are also known as "clock dividers." The frequency divider receives an input signal of frequency $f_{in}$, and generates a "down-converted" output signal of a frequency $f_{out}$. The frequency $f_{out}$ equals $f_{in}$ divided by n, where n is an integer. The frequency divider 740 receives the clock signal 601 (as $f_{in}$), and down-converts the clock signal 601 to generate a lower frequency clock signal 701 (as $f_{out}$) in accordance with the description data 712 (specifying n). The value n corresponds to a ratio of $f_{in}$ to $f_{out}$, with divider 740 outputting one cycle of $f_{out}$ for every n cycles of $f_{in}$. For example, for a 6 kHz (kilohertz) $f_{in}$, n=2 produces an $f_{out}$ of 3 kHz; n=3 produces an $f_{out}$ of 2 kHz, n=4 produces an $f_{out}$ of 1.5 kHz, and so on.

An F2F encoder 741 reads the track data bit 711 from the front of the buffer 730b queue, and outputs an F2F-encoded pulse signal 742 at a frequency of the down-converted clock 701, as set by the description data 712. At either the trailing or leading edge of the cycle of the down-converted clock signal 701, a step input 731 of the queue causes the buffer 730 to advance the next entries in the queues forward to the front. This process continues until the buffer 730 is empty, indicating that the entire serial data stream has been output.

The F2F-encoded pulses 742 output by the F2F encoder 741 may be input directly into the driver 621 (via connection 619), or a wave shaper 744 may be optionally interposed therebetween. The wave shaper 744 modifies the shape of the F2F-encoded pulses 742 to improve coupling of the magnetic flux Φ 629 with the MSR read heads 500. For example, the wave shaper 744 may smooth the leading edge of each positive and negative pulse to provide a gradual rise time to a peak positive or negative level. Rejection of low baud rate signals by the channel filters 651/652/653 may be promoted by using the wave shaper 744 to smooth transitions of the signal on connection 619, making polarity changes in the magnetic flux 629 more gradual, and thereby reducing the frequency of the pulses output by the read heads 500.

The F2F-encoded pulse signal 742, the signal on connection 619, and the current signal 622 through the inductor may be bipolar, alternating between positive and negative polarities. However, whether bipolar signals are input into the driver 621 depends in part on the choice of driver 621, and unipolar signals may instead be used (e.g., alternating between zero and a positive value). However, in the examples presented below, the F2F-encoded pulse signal 742 is bipolar, such that the signal on connection 619 input into the driver 621 is also bipolar. As noted above, the logic circuit 618 may be partially or entirely integrated into the controller 702 (either as software, hardware, or a combination thereof) providing the data stream.

Figure 8:
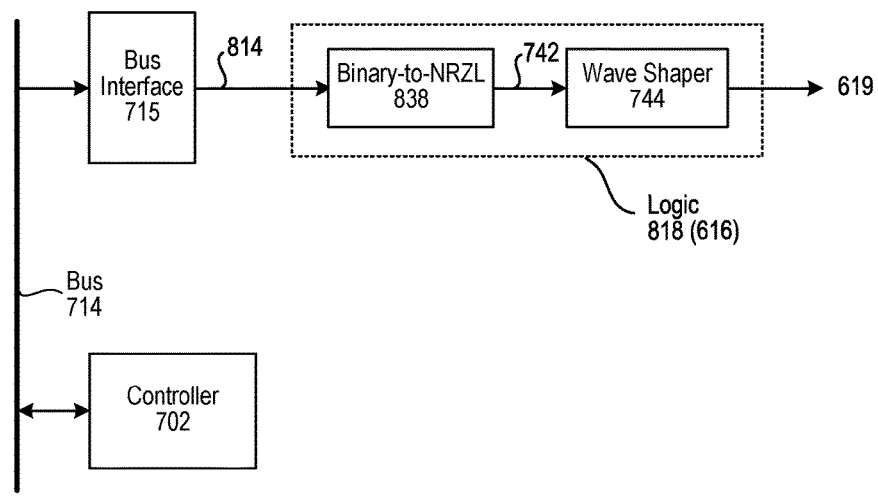
FIG. 8 is a block diagram illustrating alternative logic for use when the signal-encoding logic in FIG. 7 is integrated into the transmitter's controller.

FIG. 8 is a block diagram illustrating alternative logic circuit 818 that can be used when the signal-encoding logic in FIG. 7 is integrated into the transmitter's controller 702. The bus interface 715 receives the baud-rate modulated F2F-encoded signals from the controller 702 via the bus 714, and outputs a binary representation 814 of this signal. In the context of the stream, the signal 814 has the appearance of a pulse-width modulated signal due to the fluctuation in baud rate over time, varying the width of pulses in the signal 814. However, the width of the pulses is based on down-converted multiples of a high frequency clock signal, corresponding to a unipolar implementation of signal 742 from FIG. 7.

As illustrated in FIG. 8, the logic circuit 818 includes a binary-to-non-return-zero level (NRZL) converter 838 and a wave shaper 744. If the driver 621 accepts unipolar input, the signal 814 can be input directly into the driver 621, or passed through a unipolar implementation of the optional wave shaper 744. In the alternative, the unipolar signal 814 can be input into the binary-to-NRZL converter 838, which converts the unipolar signal 814 into a bipolar signal 742 (a binary "1" input produces a positive polarity output, and a binary "0" produces a negative polarity output). The bipolar signal 742 may then be input into the driver 621, or passed through a bipolar implementation of the optional wave shaper 744.

Figure 9:
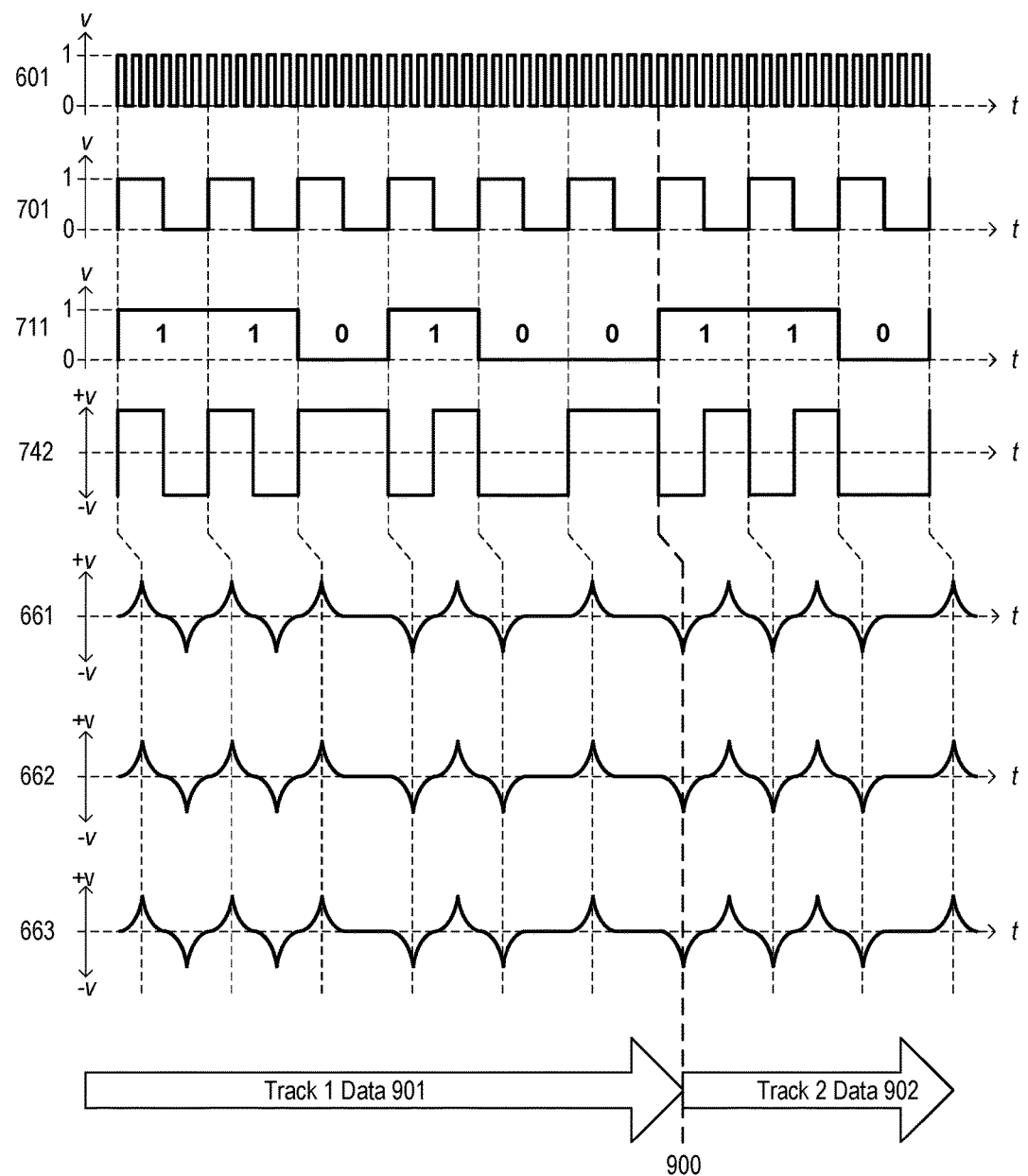
FIG. 9 is a timing diagram introducing basic operations of a system according to the disclosure.

FIG. 9 is a timing diagram illustrating basic operations of the system. In this example, the description data 612 causes the logic 618 to maintain a constant baud rate, such that the description data 612 signal is not shown. The example stream includes Track 1 data 901 (in forward or reverse bit-order) and Track 2 data 902 (in forward or reverse bit-order), with FIG. 9 illustrating a plurality of bits of each channel. The line 900 corresponds to the boundary in the serial data stream between the tracks. As noted above, additional bits (not illustrated), such as extra bits to promote clock synchronization, may be included between tracks in the serial data stream.

As illustrated in this example, six cycles of the clock signal 601 are down-converted by the frequency divider 740 to produce one cycle of the down-converted clock signal 701. In practice, the ratio between clock signal 701 and 601 may be significantly higher than six-to-one. One bit of track data 711 is output from the buffer 730a each cycle of the clock signal 701. The F2F encoder 741 converts the track data 711 into the bipolar F2F-encoded pulses 742. Each binary "1" in the track data 711 results in one positive and one negative F2F pulse per cycle of the down-converted clock 701. Each binary "0" in the track data 711 results in a single F2F pulse per cycle of the down-converted clock 701. The particular bits illustrated for signal 711 are intended to demonstrate operational principles, and do not necessarily correspond to characters or symbols compliant with the corresponding track standards 112.

Each reversal in the polarity of the F2F-encoded pulse signal 742 reverses the polarity of the magnetic flux Φ 629. As a consequence, each transition of the F2F-encoded pulse signal 742 from negative-to-positive causes the read heads 501, 502, and 503 to produce positive pulses. Likewise, each transition of the F2F-encoded pulse signal 742 from positive-to-negative causes the read head 501, 502, and 503 to produce negative pulses. In this example, the baud rate specified by the description data 612 is compatible with all of the channels of the MSR 630, such that each of the positive and negative pulses output by the read heads 501, 502, and 503 appears in the filtered signal 661, 662, and 663 output by the corresponding filter 651, 652, or 653.

Figure 10:
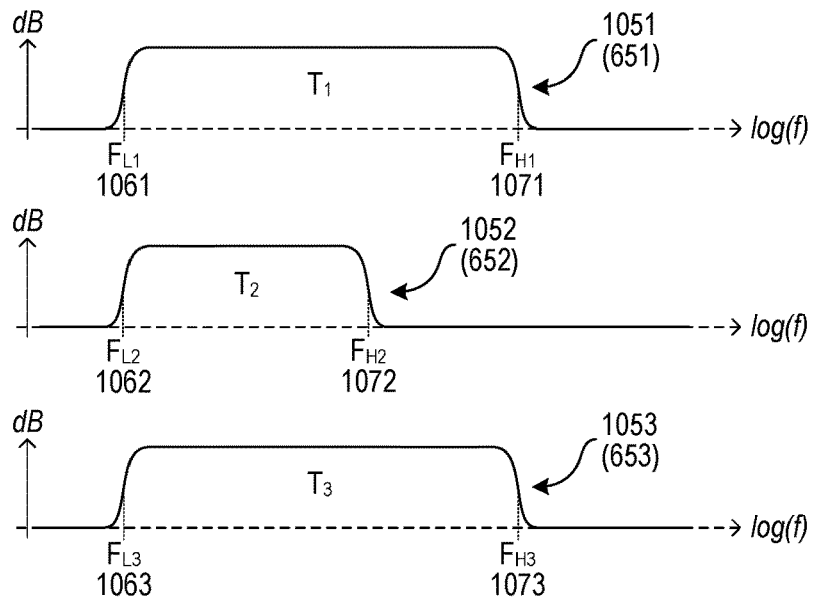
FIGS. 10 and 11 illustrate examples of the frequency filtering characteristics of the MSR's decoders in FIG. 6.
Figure 11:
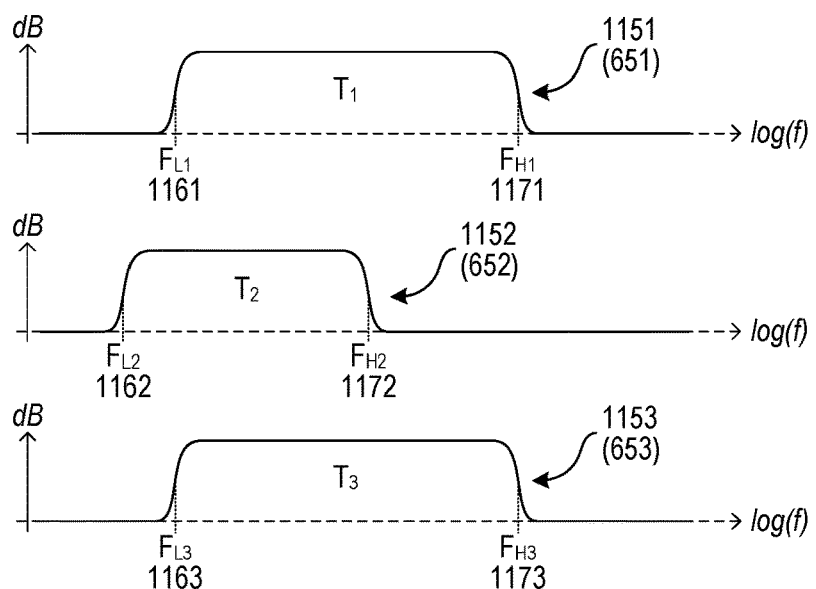

FIGS. 10 and 11 illustrate examples of the frequency-response filtering characteristics of the MSR's channel decoders 631, 632, and 633. Differences between the read heads 501/502/503, filters 651/652/653, and any intervening amplifiers (not illustrated) may each contribute to a channel's frequency response characteristics. However, for the purpose of explanation, the channel filtering characteristics will be attributed to the filters 651, 652, and 653. The type of filters included in MSRs may vary from channel-to-channel, and from model-to-model. Among other purposes, the filters 651/652/653 may be used to attenuate high frequency noise and dampen harmonics generated by the read heads 500 during a conventional card-swipe transaction. Reducing high frequency noise increases the effective resolution ADCs 670 and aids in the detection of smaller read head signals.

The filters 651, 652, and 653 may be low-pass or bandpass filters. For the purpose of explanation, the filter magnitude transfer functions are illustrated for bandpass filters using Full Width at Half Maximum (FWHM) low and high cutoff frequencies. In essence, a low pass filter can be thought of as a bandpass filter with a pass band that starts at zero Hertz.

In the example in FIG. 10, the magnitude transfer functions 1051, 1052, and 1053 of the filters 651, 652, and 653 have substantially the same low-end cutoff frequencies $F_{L1}$ 1061, $F_{L2}$ 1062, and $F_{L3}$ 1063, below which the respective filters attenuate signals, and above which signals pass in the passband. However, the high-end cutoff frequencies above which the filters attenuate signals vary. The Track 1 channel filter 651 has a high-end cutoff frequency $F_{H1}$ 1071. The Track 2 channel filter 652 has a high-end cutoff frequency $F_{H2}$ 1072. The Track 3 channel filter 653 has a high-end cutoff frequency $F_{H3}$ 1073. As illustrated, $F_{H1}$ 1051 and $F_{H3}$ 1053 are greater than $F_{H2}$ 1052.

In the example in FIG. 11, the magnitude transfer functions 1151, 1152, and 1153 of the filters 651, 652, and 653 have different low-end and high-end cutoff frequencies. The Track 1 channel filter 651 has a low-end cutoff frequency $F_{L1}$ 1161 and a high-end cutoff frequency $F_{H1}$ 1171. The Track 2 channel filter 652 has a low-end cutoff frequency $F_{L2}$ 1162 and a high-end cutoff frequency $F_{H2}$ 1172. The Track 3 channel filter 653 has a low-end cutoff frequency $F_{L3}$ 1163 and high-end cutoff frequency $F_{H3}$ 1173. As illustrated, $F_{L2}$ 1162 is lower than $F_{L1}$ 1161 and $F_{L3}$ 1163, and $F_{H1}$ 1151 and $F_{H3}$ 1153 are greater than $F_{H2}$ 1152.

In the examples in FIGS. 10 and 11, the filter characteristics of the Track 1 channel are substantially the same as those of the Track 3 channel, as may sometimes be the case. However, the Track 1 and Track 3 filtering characteristics are independent of each other.

Figure 12:
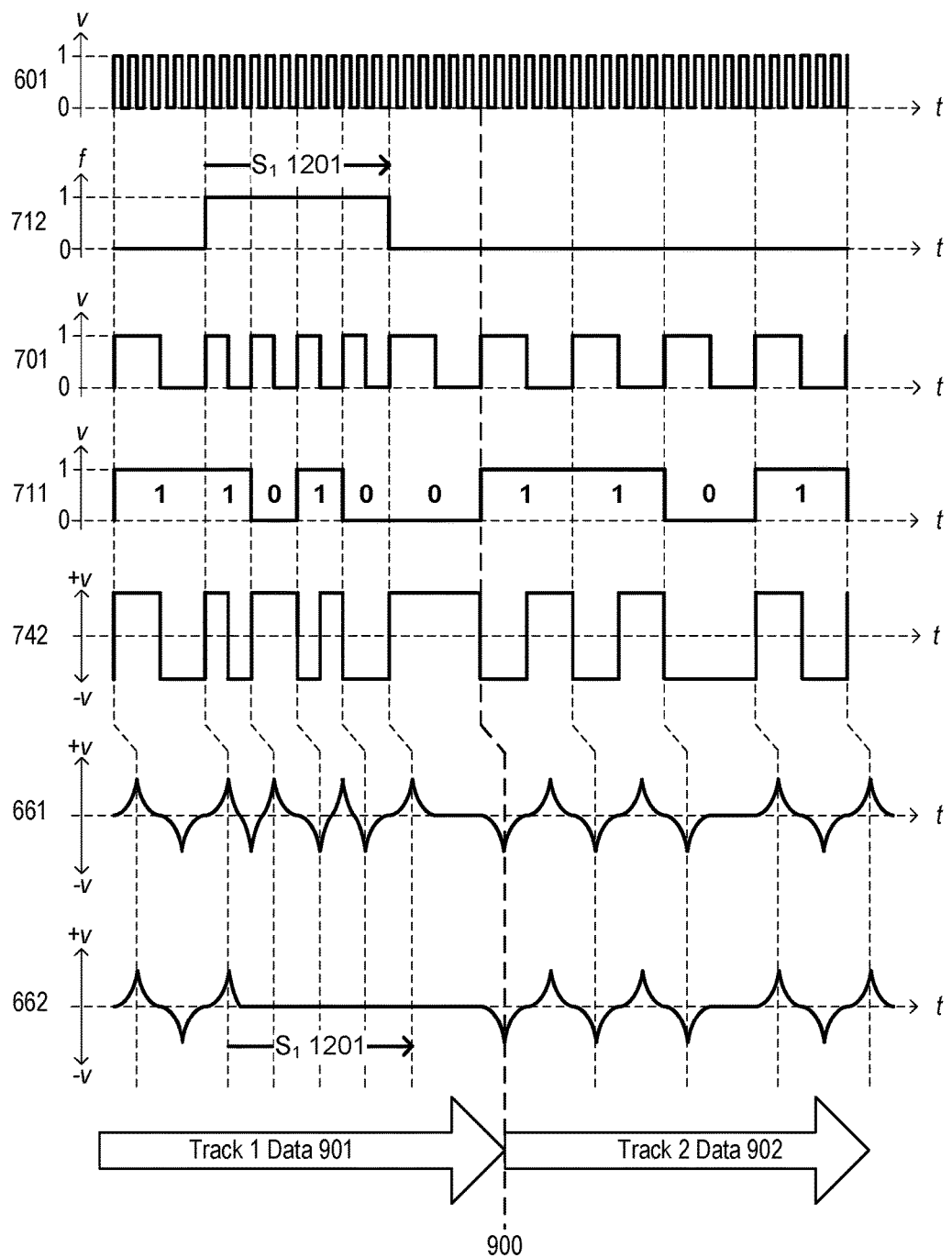
FIGS. 12 and 13 are timing diagrams illustrating baud-rate manipulation according to the system, process, and apparatus of the disclosure.

FIG. 12 is a timing diagram illustrating an example of baud-rate manipulation, leveraging differences in the high-end cutoff frequencies $F_H$ between channels, in filters such as those in FIGS. 10 and 11. Initially, during transmission of the Track 1 data 901, a first value of the description data 712 sets the down-converted clock 701 to a baud rate that induces pulses in the Track 1 read head 501 and Track 2 read head 502 that have a frequency within the passband of the filters 651 and 652.

While still transmitting the Track 1 data 901, the description data 712 signal changes to a second value, increasing the frequency of the down-converted clock 701. This increase in baud rate for the period $S_1$ 1201 induces pulses in the Track 1 read head 501 that have a frequency below the high-end cutoff frequency $F_{H1}$ of the Track 1 filter 651. However, the induced pulses in the Track 2 read head 502 have a frequency above the high-end cutoff frequency $F_{H2}$ of the Track 2 filter 652, resulting in a substantial attenuation of pulses in the filtered signal 662. Thereafter, the description data 712 signal returns to the first value for the remainder of the transmission of the Track 1 data 901, and for the transmission of the Track 2 data 902.

By increasing the transmission baud rate during the period $S_1$ 1201, a substantial portion of the Track 1 transmission in the serial stream will not be processed by the Track 2 parser 682, and/or ignored as background noise, even though the magnetic flux Φ 629 containing the Track 1 transmission is received by both the Track 1 read head 501 and the Track 2 read head 502.

Figure 13:
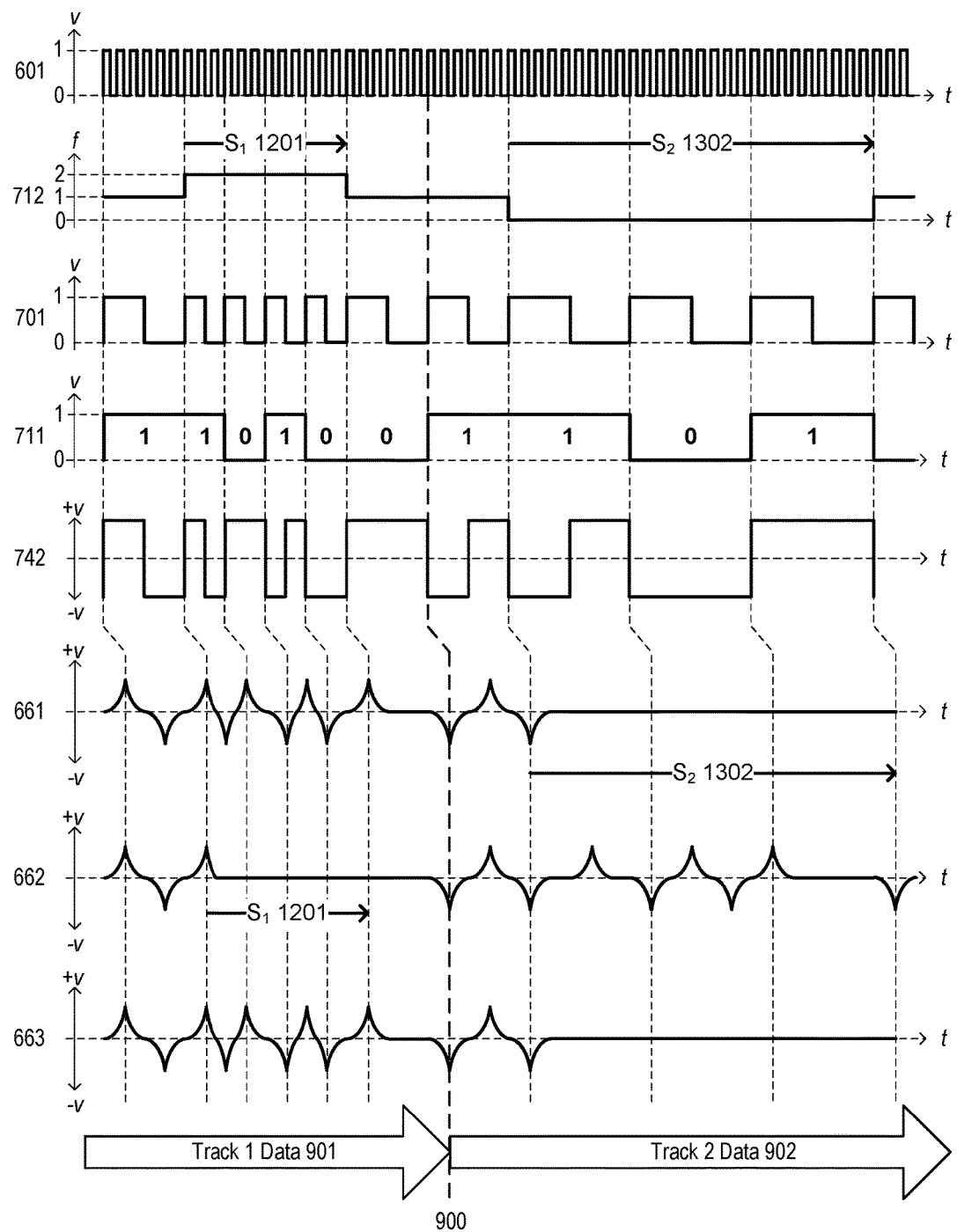

FIG. 13 is another timing diagram illustrating an example of baud-rate manipulation, leveraging differences in both low-end frequencies $F_L$ and high-end cutoff frequencies $F_H$ between channels, in filters such as those in FIG. 11. The baud rate manipulation for transmission of the Track 1 data 901 follows the same pattern as in FIG. 12. The description data 712 signal is initially set to a first value to produce a transmission baud rate that induces pulses in the Track 1 read head 501 and Track 2 read head 502 that have a frequency within the passband of both the filters 651 and 652.

The description data 712 signal then transitions to a second value, increasing the baud rate for the period $S_1$ 1201, inducing pulses that propagate in the Track 1 filtered signal 661, but that are substantially attenuated in the Track 2 filtered signal 662. That is to say, the filter 652 attenuates the received signal from the read head 502 so that any attenuated pulses included in the filtered signal 662 are below a threshold that must be exceeded for the attenuated pulses to be processed as potential track data. Thereafter, the description data 712 signal returns to the first value for the remainder of the transmission of the Track 1 data 901.

During transmission of the Track 2 data 902, the description data 712 signal transitions from the first value to a third value, decreasing the frequency of the down-converted clock 701. This decrease in baud rate for the period $S_2$ 1302 induces pulses in the Track 2 read head 502 that have a frequency above the low-end cutoff frequency $F_{L2}$ of the Track 2 filter 652. However, the induced pulses in the Track 1 read head 501 have a frequency below the low-end cutoff frequency $F_{L1}$ of the Track 1 filter 652, resulting in a substantial attenuation of those pulses in the filtered signal 661. Thereafter, the description data 712 signal returns to the first value for the remainder of the transmission of the Track 2 data 902.

By decreasing the transmission baud rate during the period $S_2$ 1302, a substantial portion of the Track 2 transmission in the serial stream will not be processed by the Track 1 parser 681, and/or ignored as background noise, even though the magnetic flux Φ 629 containing the Track 2 transmission is received by both the Track 1 read head 501 and the Track 2 read head 502. Likewise, during the period $S_2$ 1302, a substantial portion of the Track 2 transmission in the serial stream may not be processed by the Track 3 parser 683, if the passband of the Track 3 filter 653 has a similar low-end cutoff frequency $F_{L3}$ above that of the Track 2 filter 652 (as shown, for example, in FIG. 11).

With regard to the stream of track data bits 711 in FIG. 13, if the Track 1 data 901 is correctly processed by Track 1 channel decoder 631, then the attenuated filtered signal 661 during the period $S_2$ 1302 may be of no consequence to transaction processing. However, in addition to FIG. 13 illustrating operational concepts, sometimes a stream will be encoded with two sets of data encoded for the same track decoder, such as a T1N-T2-T1R stream, a T2-T1N-T2R stream, and a T2-T1R-T2R steam. In such arrangements, it can be beneficial to employ baud rate manipulation during the middle set of pulses to increase the chance of reception for the end set of pulses in case the initial set of pulses for the same track was not fully processed. It can also be beneficial when a stream includes track data for all three tracks.

Sharp, abrupt changes in baud rate (e.g., discontinuously changing baud rate between two data bits 711) may work with certain MSRs. However, when changing the baud rate, it may be desirable when transmitting to certain MSRs to change the frequency gradually over a plurality of data bits 711, rather than making rapid shifts to the frequency of the down-converted clock 701. As previously discussed, the channel decoders 631/632/633 differentiate between F2F-encoded "zero" bits and "one" bits based on the number of transitions, with an encoded "one" bit including a transition in the middle of the bit, whereas an encoded "zero" does not. Successfully differentiating between an F2F-encoded "zero" and "one" depends in part on the channel decoders 631/632/633 correctly tracking the clock rate to determine the bit-edge transitions, which becomes more difficult if the down-converted clock rate 701 undergoes abrupt or rapid changes.

Figure 14:
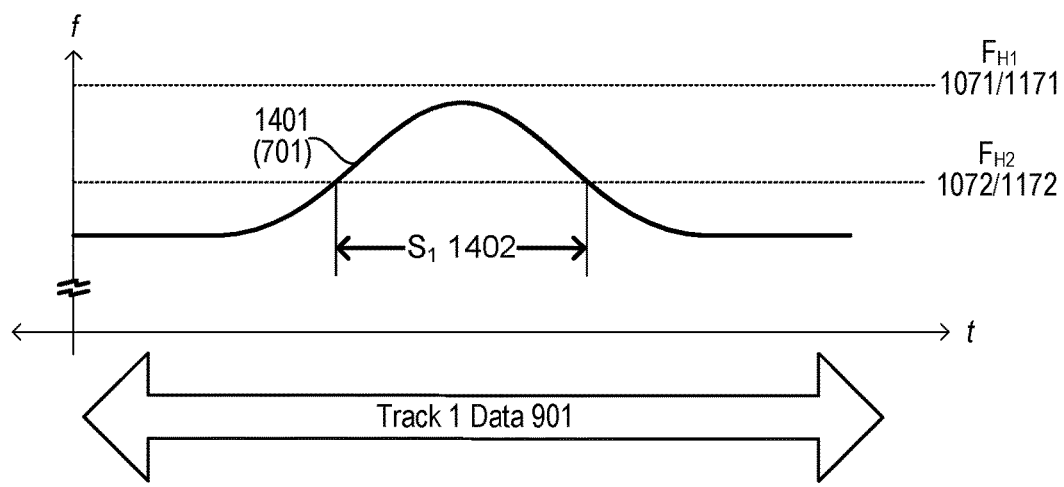
FIGS. 14 and 15 illustrate examples of how the baud rate may be manipulated relative to the frequency responses of the MSR's filters according to the system, process, and apparatus of the disclosure.
Figure 15:
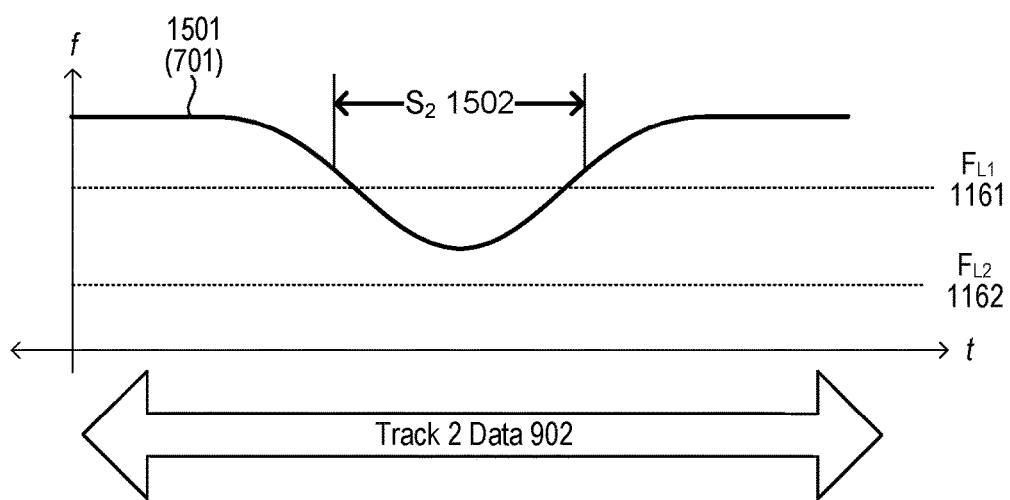

FIGS. 14 and 15 illustrate examples of how the baud rate may be gradually changed relative to the frequency responses of the MSR's filters.

The frequency curve 1401 in FIG. 14 illustrates a gradual increase in the down-converted clock 701 from a first frequency to a second frequency over a plurality of bits 711, followed by a gradual decrease back to the first frequency, while the Track 1 data 901 is transmitted. The change in the down-converted clock 701 frequency corresponds to a change in the bit-transmission baud rate. Initially, the frequency is below the Track 1 filter high-end frequency cut-off $F_{H1}$ 1071/1171 and the Track 2 filter high-end frequency cut-off $F_{H2}$ 1072/1172. The frequency gradually rises above $F_{H2}$ 1072/1172 while staying below $F_{H1}$ 1071/1171, stabilizes, and then gradually declines back below $F_{H2}$ 1072/1172. During the period $S_1$ 1402 during which the down-converted clock 701 is above $F_{H2}$ 1072/1172, the signal from the Track 2 read head 502 is substantially attenuated by the Track 2 filter 652, while the signal from the Track 1 read head 501 is transmitted through the filter 651 substantially un-attenuated.

The frequency curve 1501 in FIG. 15 illustrates a gradual decrease and increase in the down-converted clock 701 from a first frequency to a third frequency over a plurality of data bits 711, followed by a gradual increase back to the first frequency, while the Track 2 data 902 is transmitted. The change in the down-converted clock 701 frequency corresponds to the change in the bit-transmission baud rate. Initially, the frequency is above the Track 1 filter low-end frequency cut-off $F_{L1}$ 1161 and the Track 2 filter low-end frequency cut-off $F_{L2}$ 1162. The frequency gradually declines below $F_{L1}$ 1161 while staying above $F_{L2}$ 1162, stabilizes, and then gradually increases back above $F_{L1}$ 1161. During the period $S_2$ 1502 during which the down-converted clock 701 is below $F_{L1}$ 1161, the signal from the Track 1 read head 501 is substantially attenuated by the Track 1 filter 651, while the signal from the Track 2 read head 502 is transmitted through the filter 652 substantially un-attenuated.

Figure 16:
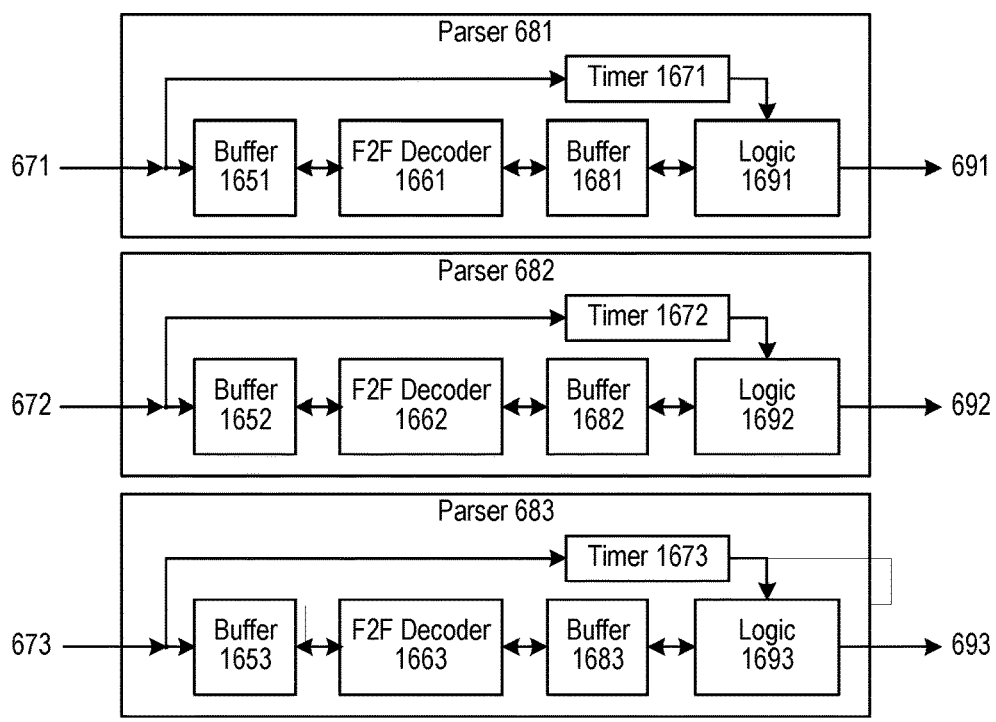
FIG. 16 is a block diagram illustrating components of conventional MSR parser components.

As illustrated in FIG. 16, the Track 1 parser 681 may include a first-in-first-out (FIFO) buffer 1651, an F2F decoder 1661, a card-present timer 1671, a buffer 1681, and parser logic 1691. The Track 2 parser 682 may include a first-in-first-out (FIFO) buffer 1652, an F2F decoder 1662, a card-present timer 1672, a buffer 1682, and parser logic 1692. The Track 3 parser 683 may include a first-in-first-out (FIFO) buffer 1653, an F2F decoder 1663, a card-present timer 1673, a buffer 1683, and parser logic 1693.

During data collection, the digital representations 671/672/673 of the filtered signals 661/662/663 are buffered in a FIFO buffers 1651/1652/1653 at the sampling rate of the ADCs 6. When the F2F decoders 1661/1662/1663 process the digitized signal 671/672/673 from their respective buffer, the clock timing embedded in received F2F signals is determined so as to adapt to variations in card swipe speed. Based on the embedded clock timing, the F2F decoders identify the edges of the encoded bits. When a transition (detected as a pulse of the filtered signal 661/662/663) occurs at an edge of a bit and at the center of a bit, the decoder records a binary "1" in the corresponding buffer 1681/1682/1683. When a transition occurs at an edge of a bit and no transition is recorded within the bit, the decoder records a binary "0." Loading the decoded bits into buffers 1681/1682/1683 facilitates processing by the logic 1691/1692/1693 to extract track data 101/102/103 from the stored bit sequences, since each track bit-sequence may be in the forward or reverse bit-order. The capacity of these buffers 1651/1652/1653 and 1181/1182/1183 may vary from channel-to-channel.

The decoder logic 1691/1692/1693 searches the decoded bits in the respective buffer 1681/1682/1683 for the track's Start Sentinel 210/310/410 in forward and reverse bit-orders. Processing of the bit already received in the buffered data may be triggered based on a triggering of a "timeout" by the channel's card-present timer 1671/1672/1673 (e.g., when a period of no flux exceed the timer's timeout threshold, causing the bits already received to be processed), the number of bits loaded into the respective buffer reaching a threshold bit-count, and/or based on detection of the Start Sentinel.

In each channel decoder 631/632/633, the reception of a new pulse or decoding of a new bit may reset the card-present timer 1671/1672/1673. If the timer expires before the logic 1691/1692/1693 begins processing the decoded bits or a Start Sentinel is detected for the respective channel, the decoder logic 1691/1692/1693 for the respective channel may "timeout." However, a timeout does not necessarily trigger a transaction failure. Once a channel times-out (e.g., Track 1 decoder 631), the decoder may stop bits, and decode data received prior to the timeout. This is particularly advantageous when the buffers 1651/1652/1653 are circular FIFO buffers that overwrite old data when full, since a timeout triggered in one channel can assure that the decoder will not lose any data from the beginning of a received magnetic pulse transmission (due to being overwritten by later data). For the channel(s) that does not timeout (such as a channel with a longer card-present time, like a Track 2 channel), that channel decoder will continue to receive bits and flush the data it receives at the beginning of the magnetic pulse stream (when the respective buffer overflows, overwriting old data), thereby overwriting data intended for a different channel prior to processing.

Figure 17:
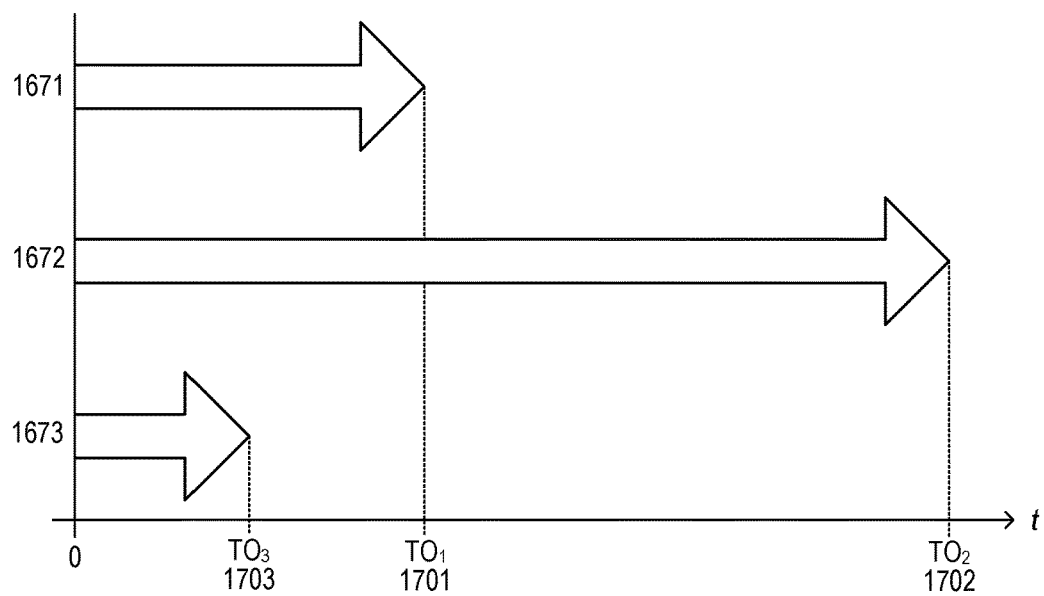
FIG. 17 illustrates examples of the channel tolerances for gaps between received data bursts in the receiver.

The time limits of the card-present timers 1671/1672/1673 that trigger a time out of the respective decoder may be different for each channel. FIG. 17 illustrates examples of the time limits of the card-present timers, which corresponds to the channel decoder's tolerance for gaps in the received filtered signal 661/662/663. The card-present timer values may be based on the character/bit rate expected when a conventional magnetic stripe card 100 is swiped across the read heads 500, with each channel's timeout limit being based on the length of time to receive a single character in the respective channel format (e.g., recording density 113 and character configuration 114) times a non-zero positive integer (e.g., 1, 2, 10, etc.). The integer value depends upon POS terminal models, with different terminals using different integer values. In the illustrated example, the Track 3 channel has the shortest time limit $TO_3$ 1703, the Track 2 channel has the longest time limit $TO_2$ 1702, and the Track 1 channel has a time limit $TO_1$ 1701 in-between. A specific embodiment would be a time limit $TO_1$ 1701 of 2 milliseconds (ms) for Track 1, a time limit $TO_2$ 1702 of 5 ms for Track 2, and a time limit $TO_3$ 1703 of 1 ms for Track 3.

A T1-T2R sequence will be used as an example of how timeouts can be used to improve processing by the MSR 630. Processing of the T1 sequence by the Track 1 channel decoder 631 can be triggered by creating a the time gap in the filtered signal 661 that exceeds the Track 1 card-present timer 1671 time limit $TO_1$ 1701, but that either does not occur in the filtered signal 662 (due to differences in cutoff frequencies between the Track 1 and Track 2 channel filter cutoff frequencies, as discussed in connection with FIGS. 10 and 11), or which does occur in the filtered signal 662 but is less than the Track 2 card-present timer 1672 time limit $TO_2$ 1702. The Track 1 decoder 631 will decode the Track 1 data (in the T1-T2R transmission) that was received prior to the timeout, with data received after the timeout not being stored and/or processed. However, the Track 2 channel decoder 632 will continue receiving the Track 2 data (in T1-T2R). Due to the buffers being circular FIFO buffers, the Track 2 channel decoder 632 may flush data that was received at the beginning of the T1-T2R transmission (i.e., Track 1 data), rather than the needed Track 2 data. As a result, both the Track 1 channel decoder 631 and the Track 2 channel decoder 632 receive the track payloads for their respective tracks, producing "good" reads for those channels (which is the desired result). Furthermore, by creating a gap in the filtered signal 663 exceeding $TO_3$ 1703 prior to or during transmission of the Track 2 data, the Track 3 decoder 633 will timeout, causing the Track 3 channel decoder 633 to process the received Track 1 data (in the 7-bits-per-character format 114a), and at most a portion of the Track 2 data lacking either the start sentinel 310 or the end sentinel 326, resulting in an "error" read (which is the desired result). Thus, in MSRs that include read heads and decoders for all three channels, a "T2=T3" conflict can also be avoided.

Referring to FIG. 17, the controller 702 may estimate the time limit for each channel's card-present timer based on the longest duration of time that it may take to transmit a single character in the respective character format times a non-zero integer, which is roughly the number of bits per character (114) divided by the slowest baud rate accepted by the channel's decoder 631/632/633 times the integer. The transmitter's controller 702 may determine baud rate information and the integer value based on a table or tables stored on the payment device 610. Such information may be updated, among other ways, by trial-and-error determinations of what rates and integer multipliers result in a completed transaction.

To leverage the card-present timers, the controller 702 may prioritize use of frameworks specifying how to order track data. The controller 702 may use different frameworks with different POS terminals and locations, and may try a series of frameworks at a location until one works. One way the controller 702 may prioritize is based on the timeout gap tolerances associated with the decoders for the respective channels specified in the framework (e.g, $TO_1$ 1701, $TO_2$ 1702, $TO_3$ 1703). For many decoders, the gap tolerances of card-present timers for each channel will be approximately equal to the longest duration it ordinarily takes to communicate a single character by card swipe times the non-zero integer value. To take advantage of this approach to generating a timeout, the controller 702 may prioritize (i.e., try) frameworks in which a slower character-rate channel (e.g., Track 2 102) occurs after a faster character-rate channel (e.g., Track 1 101, Track 3 103) ahead of frameworks where a faster character-rate channel follows a slower character-rate channel.

So for example, referring to the relative gap tolerances illustrated in FIG. 17, a controller 702 may prioritize a "T1-T2R" framework ahead of a "T2-T1R" framework, if both frameworks might otherwise be viable for the POS terminal at the location. With T1-T2R, the controller 702 may try to trigger a timeout in the Track 1 decoder 631 by modulating the baud rate after transmission of the T1 sequence produce a frequency will be outside the passband of the Track 1 channel filter 651, causing the filtered signal 661 to be heavily attenuated (i.e., filtered to a level that will not produce a pulse that parser 681 will register) for a duration exceeding $TO_1$ 1701.

This modulation can begin either between the T1 and T2R sequence (e.g., begin during interstitial clocking bits) or during the T2R sequence. If this baud rate is within the passband of the Track 2 channel filter 652, then the duration of this baud rate modulation will not trigger a timeout of the Track 2 channel card-present timer 1672. However, if this baud rate is also outside the passband of the Track 2 channel filter 652 (also causing the filtered signal 662 to be heavily attenuated), then it is the duration that the baud rate is maintained outside of the Track 2 passband must be less than that of the Track 2 channel timeout threshold $TO_2$ 1702, and transmission of the Track 2 data must be suspended coincident with the duration that the baud rate is outside of the Track 2 passband.

If the T1-T2R transmission is unsuccessful, the controller 702 may try T2R-T1. After transmission of the T2R sequence, beginning either during interstitial clocking bits between T2R and T1, or during transmission of the T1 sequence. The controller 702 may modulate the baud rate to produce a frequency outside of the passband of the Track 2 channel filter 652 for a duration exceeding the Track 2 channel timeout threshold $TO_2$ 1702. However, since $TO_1$ is smaller than $TO_2$, the controller 702 may set the modulation at a frequency between the Track 1 channel cutoff frequencies $F_{L1}$ and $F_{H1}$ so as to induce a signal from the Track 1 channel read head 501 that is within the passband of the Track 1 channel filter 651, thereby avoiding triggering of a timeout in the Track 1 channel decoder 631.

By employing framework prioritization, the controller 702 arranges track data sequences so that a decoder channel having a shorter timer threshold (e.g., 1701, 1702) will be ahead of track data sequences for a decoder channel having a longer timer threshold (e.g., 1703, 1701). This allows the transmitter 610 to trigger a timeout in the decoder channel having the shorter timer threshold prior to or while transmitting track data targeted at the decoder channel having the longer timer threshold.

While a framework or tables stored on the device 610 may specify timeout threshold values 1701/1702/1703 for the respective channels, the controller 702 may estimate the card-present timer thresholds (which correspond to the channel's gap tolerance) based on a character rate for each respective channel. For example, the controller 702 may estimate a first gap tolerance for a first channel decoder based on an amount of time to transmit a single character of data for that track at a baud rate used for first track transmissions times a non-zero integer value, and estimate a second gap tolerance for a second channel decoder based on an amount of time to transmit a single character of data for that track at a baud rate used for second track transmissions times the non-zero integer value. A margin value (e.g., +10%) may be added to increase the likelihood of triggering a timeout. Based on this stored or estimated timeout value, the controller 702 may control the modulation profile so that the duration the baud rate is outside a channel's passband (e.g., $S_1$ 1402 in FIG. 14; $S_2$ 1502 in FIG. 15) exceeds the time out value of the respective channel.

Figure 18:
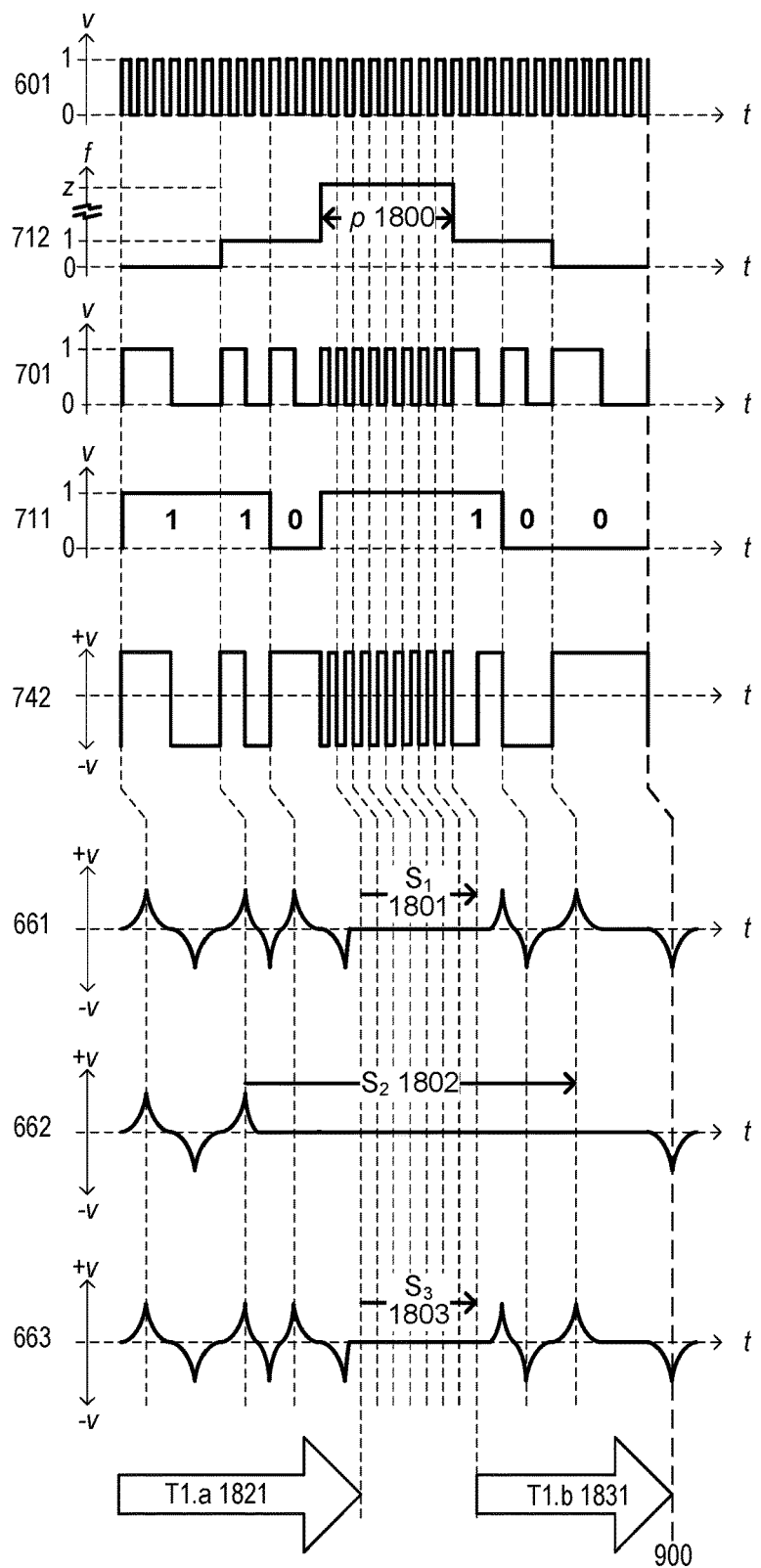
FIG. 18 is a timing diagram illustrating baud-rate manipulation according to the system, process, and apparatus of the disclosure that leverages the different tolerances in frequency responses and for gaps across channels.

FIG. 18 is a timing diagram illustrating baud-rate manipulation according to the disclosed system and method, that leverages the different tolerances in frequency responses and for gaps across channels. This approach increases the baud rate to induce signal outputs from the read heads 500 that are outside the passbands of all three MSR channels, temporarily suspending transmission of track data while at such a baud rate. The controller 702 divides the track data being transmitted into portions that precede and follow this gap-inducing baud rate, inserting nonce bits therebetween. By setting the baud rate of the track data portions preceding and following the nonce bits to be inside the passband of the respective channel whose data is being transmitted, but outside the passband of one-or-more other channels, the induced gap lengths in each channel can each be individually controlled.

In the example in FIG. 18, the baud rate is increased to exceed the passbands of all three channels coincident with transmission of Track 1 data, but this approach is equally applicable to reducing the baud rate below the passbands, and may be inserted into the transmission of any track data in order to trigger a timeout in other channels.

Initially, during transmission of a first "T1.a" portion 1821 of the Track 1 data 901, a first value of the description data 712 signal sets the down-converted clock 701 to produce a first baud rate that induces pulses in the read heads 500 that have a frequency within the passband of the filters 651, 652, and 653.

While still transmitting the first "T1.a" portion 1821, the description data 712 signal changes to a second value, increasing the frequency of the down-converted clock 701 to produce a second baud rate. This increase in baud rate induces pulses in the Track 1 read head 501 and the Track 3 read head 503 that have a frequency below the high-end cutoff frequencies $F_{H1}$ of the Track 1 filter 651 and $F_{H3}$ of the Track 3 filter 653. However, the induced pulses in the Track 2 read head 502 exhibit a frequency above the high-end cutoff frequency $F_{H2}$ of the Track 2 filter 652, resulting in a substantial attenuation of those pulses in the filtered signal 662.

Thereafter, the description data 712 signal sets the down-converted clock 701 to produce a third baud rate that, for the period "p" 1800, induces pulses in the read heads 500 that have a frequency above the high-end cutoff frequencies $F_H$ the passband of all three filters 651, 652, and 653 (and possibly above the frequency response of the read heads 500 themselves). For the period "p" 1800, the track data buffer 730b is loaded with nonce data (i.e., not card track data). The nonce data may be, for example, a series of binary ones so as to increase the number of transitions in the F2F-encoded signal 742. Increasing the number of transitions in the F2F-encoded signal 742 generated by the nonce data when the clock 701 is increased to a high-frequency value promotes signal attenuation in the MSR 630 for the duration of the period p 1800. Likewise, if the clock 701 was instead decreased to be below the low frequency cutoff frequencies $F_L$, using zeroes for the nonce data would further decrease the number of transitions.

Thereafter, the description data 712 signal returns to the second value and resumes transmitting the Track 1 data 901, transmitting a second "T1.b" portion 1831. Then, the description data 712 signal returns to the first value for the remainder of the transmission of the second T1.b portion 1831.

As a result of the baud rate manipulation, pulses output in the Track 1 filtered signal 661 are substantially attenuated for the period $S_1$ 1801, which includes pulses generated during the period p 1800 when the down-converted clock 701 is at the third baud rate. That is to say, the filter 651 attenuates the received signal from the read head 501 so that any attenuated pulses included in the filtered signal 661 are below the threshold that must be exceeded for the attenuated pulses to be processed by the channel decoder as potential track data.

Pulses output in the Track 2 filtered signal 662 are substantially attenuated for the period $S_2$ 1802, which includes pulses generated during the period when the down-converted clock 701 is at the second baud rate, and the period p 1800 when the down-converted clock 701 is at the third baud rate. Pulses output in the Track 3 filtered signal 663 are substantially attenuated for the period $S_3$ 1803, which includes pulses generated during the period p 1800 when the down-converted clock 701 is at the third baud rate.

By managing the length of the durations $S_1$ 1801, $S_2$ 1802, and $S_3$ 1803 that will be created by the data stream, the transmitter 610 can modulate the transmission baud rate to selectively cause an MSR decoder to timeout. A specific embodiment would be if the Track 1 time limit $TO_1$ 1701 is 2 ms, the Track 2 time limit $TO_2$ 1702 is 5 ms, the Track 3 time limit $TO_3$ 1703 is 1 ms, the periods p 1800, $S_1$ 1801, and $S_3$ 1803 are 1.5 ms, and the period $S_2$ 1802 is 6 ms. The result will be that the Track 1 decoder 631 will not time out during transmission of the Track 1 data 901, while the Track 2 channel decoder 632 and the Track 3 channel decoder 633 will time out. This reduces the processing of encoded Track 1 bits in the stream by the Track 2 and Track 3 channel decoders. Similar results can be obtained leveraging the low-end filter cutoffs $F_L$, as discussed in connection with FIG. 11 and FIG. 13. This approach can also be used to mitigate the T2═T3 conflict by dividing the Track 2 data into two portions and inducing a period p 1800 longer than $TO_3$ 1703 but shorter than $TO_1$ 1701 and $TO_2$, 1702 so as to cause the Track 3 decoder 633 to time out before receiving either the Track 2 Start Sentinel 310 or the Track 2 End Sentinel 326 (depending upon whether transmission of the Track 2 data is in reverse or forward bit-order).

FIGS. 19 and 20 illustrate examples of how the rate of change in the baud rate may be used to differentiate channels. The frequency curve 1901 in FIG. 19 illustrates a gradual increase in the down-converted clock 701 from a first frequency to a second frequency over a plurality of data bits (711), followed by a gradual decrease back to the first frequency, while data for a first track 1904 (Track "X") is being transmitted (that is, while data corresponding to Track 1 101, Track 2 102, or Track 3 103 is being transmitted, inclusive of any clocking bits preceding or following the track data). The frequency curve 2001 in FIG. 20 illustrates a gradual decrease and increase in the down-converted clock 701 from a first frequency to a third frequency over a plurality of data bits 711, followed by a gradual increase back to the first frequency, while data for a second track 2005 (Track "Y") is being transmitted (that is, while data corresponding to Track 1 101, Track 2 102, or Track 3 103 is being transmitted, inclusive of any clocking bits preceding or following the track data).

Each of the channel decoders 631, 632, and 633 may have a different tolerance for the rate of change of the baud rate. These tolerances may depend in part on the ability of the clock generator in the F2F decoders 1661, 1662, and 1663 to adjust to changes in the duration corresponding to each un-encoded data bit of data, as determined based on the edge transitions in the received F2F-encoded data stream. A failure to track changes to the clock frequency may cause the F2F decoders to misconstrue an F2F-encoded binary one to be decoded as two binary zeros, to misconstrue two F2F-encoded zeros to be decoded as one binary one, and/or to trigger a timeout while the clock generator reestablishes bit-timing. The rate of change corresponds to the 1st derivative of the frequency change function. The 1st derivative of the frequency change function is the slope of a line tangent to that function.

In FIG. 19, the peak rate of change $\Delta_{UX}$ that a first decoder can tolerate as the down-converted clock frequency 701 gradually rises (subscript "U" for up) from the first baud rate to the second baud rate is illustrated by the tangent line 1916 (having a positive slope value). The peak rate of change $\Delta_{DX}$ that the first decoder can tolerate as the down-converted clock frequency 701 gradually descends (subscript "D" for down) from the second baud rate to the first baud rate is illustrated by the tangent line 1917 (having a negative slope value).

In FIG. 20, the peak rate of change $\Delta_{BY}$ that a second decoder can tolerate as the down-converted clock frequency 701 gradually decreases from the first baud rate to the third baud rate is illustrated by the tangent line 2018 (having a negative slope value). The peak rate of change $\Delta_{UY}$ that the second decoder can tolerate as the down-converted clock frequency 701 gradually increases from the third baud rate to the first baud rate is illustrated by the tangent line 2019 (having a positive slope value).

The magnitudes of the positive slope $\Delta_{UX}$ 1916, negative slope $\Delta_{DX}$ 1917, negative slope $\Delta_{BY}$ 2018, and the positive slope $\Delta_{UY}$ 2018 may all be different, such that decoders may have different sensitivities to the rate of change as the baud rate increases and as the baud rate decreases, and differences across channels.

By increasing the baud rate during transmission of track data intended for a Track "A" channel faster than a Track "B" channel decoder can handle, a timeout can be triggered in the Track "B" channel decoder. Likewise, by decreasing the baud rate during transmission of track data intended for Track "A" faster than a Track "B" channel decoder can handle, a timeout can be triggered in the track "B" channel decoder. As previously discussed, a timeout results in the timed-out channel decoder processing data buffered prior to the timeout, while ignoring data received after the timeout. This method of triggering channel decoder timeouts can be used in conjunction with changing the baud rate to generate pulses from the read heads 500 that are outside the passbands of the channel filters 651/652/653 (as discussed in connection with FIGS. 10-18), or can be used on its own with baud rates that induce pulses from the read heads 500 that fall within the passbands of the respective channels.

Figure 21:
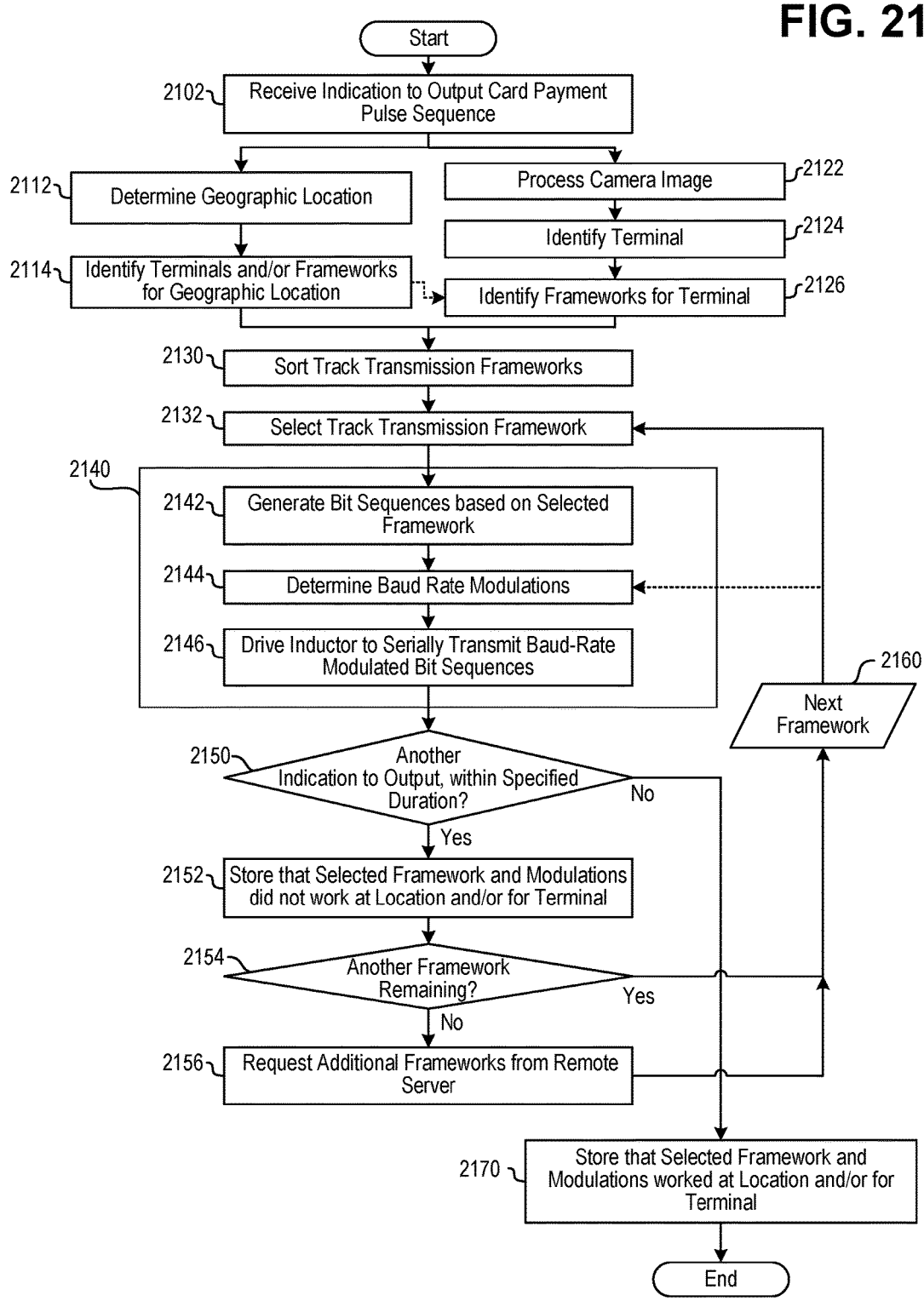
FIGS. 21 to 23 are flow diagrams of a method according to the disclosure.
Figure 22:
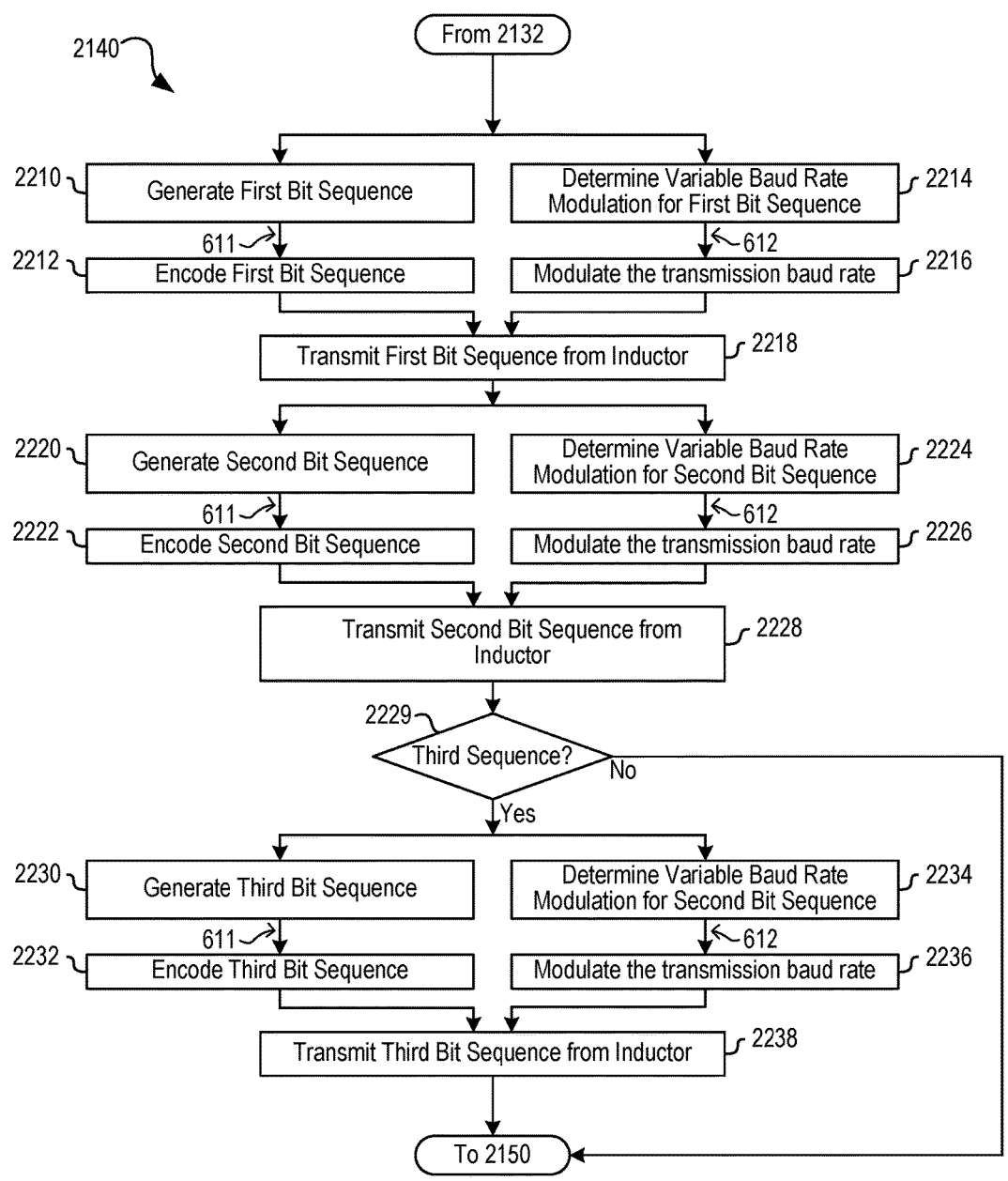
Figure 23:
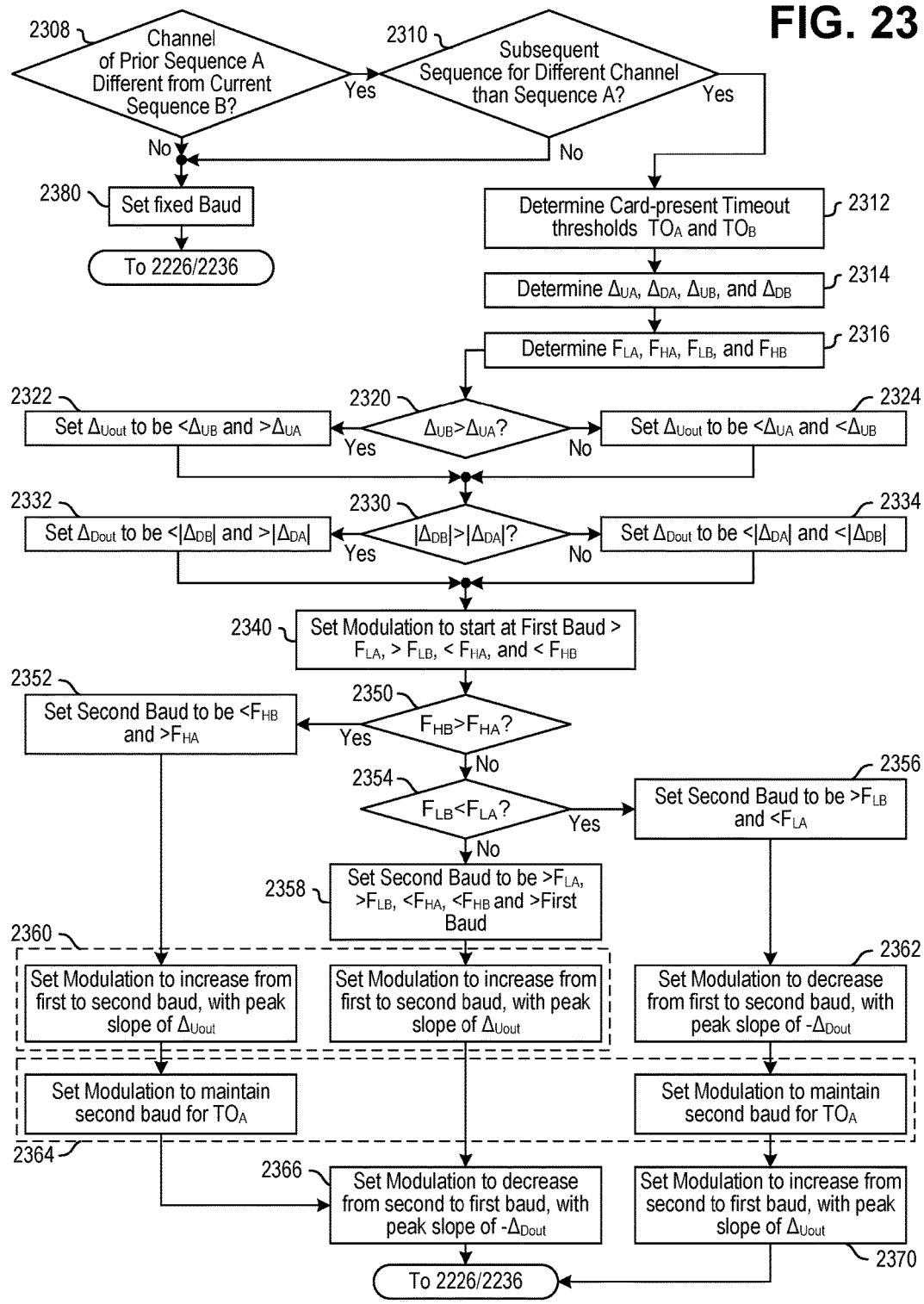

FIGS. 21 to 23 are flow diagrams of a method of implementing baud rate manipulation in a contactless electronic payment system implemented according to the disclosure.

FIG. 21 how the transmitter selectively determines the pulse sequences to use. The contactless payment device 610 receives (2102) an indication to output a magnetic stripe pulse sequence. Examples of receiving the indication is detecting a "touch" of a region of a graphical user interface (GUI) on touch-sensitive display that corresponds to a "pay" button, or actuation of a physical "pay" button.

The controller 702 of the contactless payment device 610 determines (2112) its geographic location. Any technique may be used to acquire location information, such as using information from satellite geographic positioning system receiver such as a Global Positioning System (GPS) receiver and/or a Global Navigation Satellite System (GLONASS) receiver. Other examples of how location information may be acquired include using other radio sources (e.g., via at least one antenna), such as mapping services that triangulate off of known WiFi service set identifiers (SSIDs) or cellular towers within range of the device 610.

The device 610 may also capture one or more images using a camera of the device 610, and process (2122) the image(s) captured by the camera to identify patterns in the captured image (or images) to identify (2144) whether any of the identified patterns corresponds to that of a specific type of POS terminal. For example, the "Square" mag-reader dongle made by Square, Incorporated, has a distinctive shape that is identifiable using conventional image pattern recognition. In addition, some POS terminals have distinctively shaped features such as the shape of the pin/keypad.

Certain manufacturers and types of POS terminals may be known to predominate in certain geographic regions/countries. Using information stored on the device and/or by accessing a database over a wireless network, the controller 702 of the device 610 may identify (2114) pulse-transmission-sequence frameworks and/or terminal types for the geographic location and/or identify (2126) pulse sequence frameworks for the identified terminal.

The device 610 stores a list of pulse-transmission-sequence frameworks. Frameworks specify how to structure the transmission stream, such as indicating to use T2-T1R, T2-T1R-T2R, T2-T1NR, etc. A framework may include other information rules, and parameters, such as whether to include clocking bits before and/or after a track sequence, identifiers for POS terminal types associated with the geographic location, and information about default baud rate modulations. Other information may be stored on the device in tables or a database indexed by location, terminal type, and/or other indicia that can be cross-referenced against the information included in the frameworks. Such tables may include values such as low-end cutoff frequencies $F_L$ and high-end cutoff frequencies $F_H$ for respective channels (as discussed with FIGS. 10 and 11), card-present timer limits for respective channels (as discussed with FIG. 17) or the integer multiplier used to estimate such time limits, MSR channel buffer capacities, and baud rate-of-change tolerances for respective channels (as discussed with FIGS. 19 and 20). Such values may also be included within a selected framework itself.

The controller 702 retrieves track data needed to assemble the bit sequences specified in a selected framework from memory storage. The controller 702 generates and assembles the bit sequences using the stored magnetic stripe track data, and determines the baud rate modulation(s) to be used with respective sequences. For example, if a framework specifies to use T2-T1R-T2R, the device 610 will generate a first F2F-encoded pulse sequence from the Track 2 data stored for a selected payment card, will generate a second F2F-encoded pulse sequence from the Track 1 data for the selected payment card in reverse bit-order, and will generate a third F2F-encoded pulse sequence from the Track 2 data for the selected payment card in reverse bit-order.

Each framework may be associated with a weighted score corresponding to a confidence level that the sequence will or will not work at the geographic location and/or with the specific terminal. The controller 702 sorts (2130) the identified frameworks in accordance with sets of rules. The rules may give highest priority to frameworks that are indicated as working at the specific geographic location and/or with a specific identified terminal. Frameworks indicated as working within the region (e.g., a country), but untested at the specific location and/or with the specific identified terminal, may be given next-highest priority. Frameworks known not to work at the specific geographic location and in the regions and/or with the specific identified terminal may be given lowest priority. Among frameworks given the lowest priority, if the associated weighted confidence score fails to satisfy a stored threshold value, those frameworks may be culled from the sorted list as being unlikely to work. Frameworks indicated as working within the geographic region, but not at the specific geographic location and/or with the specific identified terminal, may be given next-to-last priority.

The controller 702 may further sort frameworks to prioritize the frameworks based on the order of track sequences to facilitate a controlled triggering of decoder timeouts and buffer overflows. For example, as will be described further in connection with FIG. 23, the controller 702 may determine a card-present timeout $TO_A$ associated with decoders for a first track sequence "A" specified by a framework, and determine a card-present timeout $TO_B$ associated with decoders for a second track sequence "B" specified by the respective framework, where A and B are different channels, and A will precede B in the data stream. By prioritizing frameworks where $TO_A$ is shorter (less) than $TO_B$ ahead of other frameworks, there are more options available for triggering a timeout of the A channel decoder using baud rate modulation. Thus, if two frameworks have similar weighted scores, the controller 702 can further order them based on $TO_A$ and $TO_B$.

Some frameworks may retain their default ordering in the list if they have not been tested. The default ordering may be based on, among other things, each framework's "success" rate in other geographic regions or overall. The list of candidate pulse transmission frameworks, their default ordering, and the individual or combined weighted scores indicating which sequences do and do not work at the location and within the region and/or with a specific POS terminal type may be reconciled between the contactless payment device 610 and a database on a remote server, either as part of the transaction process or as part of occasional updates.

In the absence of geographic location information and terminal type information, rules on the device 610 may configure the controller 702 to give priority to the last frameworks used by the device that worked, and may sort the rest of the frameworks based on their weighted confidence score. By rule, the list may be limited to a specific number of frameworks, such as limited to three-to-five frameworks having the highest (best) weighted scores. The list may also be limited to frameworks that have weighted scores exceeding a threshold value.

Based on the ordered priority, the controller 702 of the contactless payment device 610 selects (2132) a framework, retrieves the needed track data from storage, and applies (2140) the selected framework to transmit track data for the selected payment card. Application of the selected framework will be discussed in greater detail with FIGS. 22 and 23, and includes generating (2142) bit sequences based on the selected framework, determining (2144) baud rate modulations for at least the first sequence, and serially transmitting (2146) the baud-rate modulated bit sequences from the inductor 628, as well as any un-modulated bit sequences. Prior to transmission, one-or-more of the generated bit sequences and corresponding baud rate modulation (i.e., the description data 612) may be stored in device memory.

Ideally, after the stream of magnetic pulses is emitted by the inductor 628, the channel decoders 631/632/633 successfully decode the received pulses and the payment transaction is approved. However, if the device 610 receives (2150 "Yes") another indication to output card data within a specified duration (e.g., thirty seconds), the controller 702 determines that the transaction was not approved, since the device user is indicating to try again. The controller 702 stores (2152) that the selected framework did not work at the location and/or POS terminal type (updating the framework's weighted score(s)). The controller 702 may also store details regarding the baud rate modulation that was used.

If another framework remains in the sorted list (2154 "Yes"), the device 610 selects (2160) the next framework and repeats the process. In the alternative, the device 610 may reuse the existing framework, and instead alter the baud rate modulations.

If the contactless payment device 610 runs out of frameworks to try (2154 "No") before the user loses patience and gives up, there are several options available, depending upon stored rules. For example, controller 702 may retry a framework at the top of the sorted list, but using different baud rates and baud rate modulations. As another example, if there is wireless network connectivity, the controller 702 may request (2156) additional sequence frameworks from a remote server. As a last resort, the contactless payment device 610 may output an error indication for the benefit of the device's user.

If the device 610 does not receive (2150 "No") another indication to output a card payment pulse sequence within a specified duration (e.g., thirty seconds), the assumption is made that the transaction was approved. The controller 702 stores (2170) that the framework did work at the location and/or with the identified POS terminal type (updating the framework's weighted score). The controller 702 may also store details regarding the baud rate modulation that was used. The time and date of the transaction may also be logged by the device 610, so as to allow a later comparison of the transaction with transactions approved by a transaction processor (2480 in FIG. 24), so as to validate the improved confidence value (i.e., the weighted score) associated with the framework.

FIG. 22 is an example of how the controller 702 applies (2140) the selected framework. Frameworks specify at least two bit sequence (e.g., T2-T1, T2-T1R, T1N-T2, T1-T2R, etc.), but may specify more (e.g., T1N-T2-T1R, T2-T1N-T2R, T2-T1R-T2R, etc.). A framework may specify plural sequences to transmit data corresponding to a same card track, such as T1N and T1R in T1N-T2-T1R, and T2 and T2R in T2-T1R-T2R. The example of FIG. 22 illustrates use of three bit sequences, but the principles are the same for two.

In accordance with the selected framework, the controller 702 generates (2210) a first bit sequence. For example, if the framework specifies "T2", the Track 2 data for the selected card is generated (to be part of track data 611) in a forward bit-order, and if the framework specifies "T2R", the Track 2 data for the selected card is generated (to be part of track data 611) in a reverse bit-order. The controller 702 may also determine (2214) a variable baud rate modulation for the first bit sequence. The baud rate modulation is expressed by the description data 612.

For example, a rule may specify to the controller 702 that if the first bit sequence is composed of Track 2 data, the selected framework does not include a subsequent Track 3 bit sequence, and the target POS terminal has (or might have, if indeterminate) a three-channel MSR 630, then the baud rate should be modulated to cause a timeout of the Track 3 channel decoder 633, so as to avoid a T2==T3 conflict. This may be achieved either by modulating the baud rate to produce a frequency that is outside the Channel 3 decoder filter's passband, but inside the Channel 2 decoder filter's passband. Since $TO_2 \gg TO_3$, the approach discussed with FIG. 18 may also or instead be used to avoid a T2==T3 conflict, dividing the Track 2 bit sequence into portions. The controller 702 may also employ the rate of change of baud approach discussed with FIGS. 19 and 20 to trigger a timeout in the Track 3 decoder, either with or without passband-based baud rate modulation.

Another rule may specify to the controller 702 that if the first bit sequence is composed of Track 2 data, the selected framework does include a subsequent Track 3 bit sequence, and the target POS terminal has (or might have, if indeterminate) a three-channel MSR 630, then the baud rate should be modulated to cause the Track 3 channel filter 653 to filter out a portion of the Track 2 sequence (without triggering a timeout), so as to avoid a T2==T3 conflict. For example, baud rate modulation may be used to obscure either the Track 2 Start Sentinel 310 and/or the End Sentinel 326, with the modulation beginning during clocking bits preceding the respective sentinel, and/or extending into clocking bits that follows the other sentinel.

Corresponding rules may be used if the first bit sequence is Track 3 data. However, if the selected framework does not include a subsequent Track 2 bit sequence, the controller 702 may modulate the baud rate to produce a frequency that is outside the Channel 2 decoder filter's passband, but inside the Channel 3 decoder filter's, to avoid a T2==T3, without use of the solution discussed with FIG. 18 (since $TO_2 \gg TO_3$). The controller 702 may also employ the rate of change of baud approach discussed with FIGS. 19 and 20 to trigger a timeout in the Track 2 decoder, either with or without passband-based baud rate modulation.

If the controller 702 has determined (per steps 2114 or 2124) that the MSR 630 of the target POS terminal is two-channel receiver lacking either a Track 2 or Track 3 channel decoder, or if the first bit sequence is composed of Track 1 data, rules may specify to the controller 702 to set the baud rate for the first bit sequence to a fixed value (i.e., not modulated), in which case the description data 612 value may be constant for an entirety of the first bit sequence.

The F2F encoder 741 of the device 610 encodes (2212) the first bit sequence, modulates (2216) the transmission baud rate in accordance with description-data controlled clock signal 701, and transmits (2218) the encoded bit sequence in accordance with the modulated baud rate to the MST 620 to be emitted from the inductor 628. As illustrated in FIG. 7, encoding (2212) and modulation (2216) can be performed contemporaneously by controlling the clock 701 used by the F2F encoder 741. As an alternative, the first bit sequence can be F2F encoded, and then the F2F encoded pulses output to the MST 620 in accordance with the variable baud rate. This is also true for the second and third bit sequences (steps 2224, 2226, 2234, 2236).

In a similar manner as described for the first bit sequence, the device 610 generates (2220) the second bit sequence, determines (2224) the variable baud rate modulation for the second bit sequence, encodes (2222) the second bit sequence, modulates (2226) the transmission baud rate, and transmits (2228) the encoded second bit sequence in accordance with the modulated baud rate from the inductor 628. The variable baud rate modulation for the second bit sequence is determined (2224) based on the preceding and subsequent channels.

For example, if there are three bit sequences specified by the framework, and both the first and second bit sequences and the first and third bit sequences are for different channels (e.g., T1-T2-T2R or T1-T2R-T3R), the controller 702 may execute a rule to modulate the baud rate of the second bit sequence to trigger a timeout of the channel decoder corresponding to the preceding (first) bit sequence. Further, if the second bit sequence is composed of Track 2 or Track 3 data, the third bit sequence is not the other of Track 2 and Track 3 data (e.g., T1-T2-T2R but not T1-T2R-T3R), and there is a potential for a T2==T3 conflict, the controller 702 may also modulate the baud rate and/or the rate of change that baud changes to avoid the conflict by triggering a timeout in the other channel decoder (e.g., in the Track 3 decoder 633 if the second bit sequence comprises Track 2 data). The controller 702 avoids a T2==T3 conflict as discussed above with rules used by the controller 702 in conjunction with step 2214. Using the methodology from FIG. 18, baud rate modulation targeting one channel can be combined with gap generated in all channels (period p 1800) to selectively trigger timeouts in one channel or in multiple channels. The baud rate modulation of the second bit sequence may also be set to configure at least some of the data in the filtered signal of the other channel experiencing the conflict. Likewise, the controller 702 can control the rate of change of the baud modulation to trigger a timeout to avoid a T2==T3 conflict, either alone or in combination with passband-based modulation.

However, if there are three bit sequences specified by the framework, and the first and second bit sequences are different, but the first and third bit sequences are for a same channel (e.g., T2-T1R-T2R), the controller 702 may execute a rule to set a fixed baud rate for the second bit sequence instead of triggering a timeout of the channel decoder for the first (and third) bit sequences, absent a potential T2==T3 conflict. If the second bit sequence is composed of Track 2 or Track 3 data, and there is a potential for a T2==T3 conflict, the controller 702 may modulate the baud rate and/or the baud rate of change as discussed above.

If there is a third bit sequence specified in the selected framework (2229 "Yes"), the controller generates (2230) the third bit sequence, encodes (2232) the third bit sequence, and transmits (2238) the encoded bit third sequence to be emitted by the inductor 628 as discussed above in connection with the second bit sequence, ignoring rule provisions dependent on subsequent bit sequences. As illustrated, the third bit sequence is the final bit sequence specified by the selected framework for inclusion in the stream.

Although FIG. 22 shows bit sequence assembly as alternating between generation (2210/2220/2230) and transmission (2218/2228/2238), the controller 702 may generate the sequences, store them all in memory, and thereafter sequentially transmit them in series via the inductor.

FIG. 23 is an example of the process executed by the controller 702 as part of steps 2224 and 2234 in FIG. 22. Avoidance of a T2==T3 conflict is not specifically addressed in FIG. 23, as the example in FIG. 23 focusses on generating a timeout in a prior channel's decoder. However, as called for by rule, the controller 702 will combine the process in FIG. 23 with the T2==T3 conflict avoidance techniques discussed above. The example in FIG. 23 is for a framework that includes bit sequence for two payment card track channels, such as T2-T1, T2-T1R, T1N-T2, T1-T2R, T1N-T2-T1R, T2-T1N-T2R, or T2-T1R-T2R.

The device 610 determines that a channel of a prior "A" bit sequence is different from the channel of the current "B" bit sequence (2308 "Yes"), and that a subsequent bit sequence (if any) is for a different channel than the "A" bit sequence (2310 "Yes"). If there is no subsequent bit sequence, step 2310 is skipped entirely. For example, in step 2224 for a T2-T1R framework, the first bit sequence T2 will comprise Track 2 102 data in forward bit-order, and the second bit sequence T1R will comprise Track 1 101 data in reverse bit-order. So the channel "A" data is for the Track 2 decoder 632, and the channel "B" data is for the Track 1 decoder 631, so the controller will proceed to step 2312.

As another example for step 2224 with a T1N-T2-T1R framework, the first bit sequence T1N will be based on the Track 1 format, the second bit sequence T2 will be comprise Track 2 102 data in forward bit-order, and the third bit sequence T1R is Track 1 data in reverse bit-order. The T1N sequence and the T1R sequence are both directed to the Track 1 channel decoder 631, with the T1R sequence included for redundancy in case the decoder 631 does not detect or recognize T1N. However, triggering a timeout in the Track 1 channel decoder 631 would mean that the T1R sequence will not be processed, even if T1N is not recognized. Therefore, the process (2310 "No") may set (2380) a fixed baud rate for the T2 bit sequence. However, when this process is repeated at step 2234 for the third bit sequence (T1R), the process will proceed to step 2312, setting a baud rate modulation to trigger a timeout of the Track 2 channel decoder 632.

At step 2312, the controller 702 determines the card-present timeout thresholds $TO_A$ and $TO_B$ for the first and second track sequence channels, as discussed with FIGS. 16 and 17. This may have previously been determined by the controller 702 as part of sorting (2130) the track frameworks when giving priority to frameworks that arrange the track data for the channel with the shorter timeout threshold before the data for a track channel with a longer timeout threshold.

The controller 702 may calculate the average amount of time taken to transmit a non-zero integer number of single characters for a channel to estimate the channel's card-present timeout threshold. The controller 702 may estimate this, among other ways, from the typical time to swipe an entire track of a magnetic stripe 11 divided by the information content 115 of that channel.

The controller 702 determines (2314) the rate-of-change limits $\Delta_{UA}$ and $A_{DA}$ for the first channel, and $\Delta_{UB}$ and $A_{DA}$ for the second channel, as discussed with FIGS. 19 and 20 (e.g., specified in the selected framework, identified in a table or database). The controller 702 also determines (2316) estimated decoder filter bandpass limits $F_{LA}$ and $F_{HA}$ for the first channel, and $F_{LB}$ and $F_{HB}$ for the second channel, as discussed in connection with FIGS. 10 and 11 (e.g., specified in the selected framework, identified in a table or database).

How the controller 702 determines each of the parameters in 2312, 2314, and 2316 is independent of the other parameters. One-or-more of the parameters may be included in the selected framework, the parameters may be looked up in a table or database stored on the device 610, or estimated from the available information. Look-ups in table(s) may be based on one-or-more of the most likely POS terminal-types for the geographic location (as determined at 2114), the type of terminal identified by image processing (as determined at 2114 or 2124), or based on terminal types specified in or associated with the selected framework (as selected at 2132).

As discussed above, the controller 702 may estimate the timeout limits $TO_A$ and $TO_B$ based on the longest duration of time to transmit a single character in the respective character format times a non-zero integer value, which can be approximated as the number of bits per character (114) divided by the slowest baud rate accepted by the channel's decoder 631/632/633 times the integer. A margin value (e.g., +10%) may be added to increase the likelihood of triggering a timeout. Another approach the controller 702 may use to estimate the timeout limits $TO_A$ and $TO_B$ is based the average amount of time to transmit an entire track of stripe 11 data, divided by the information content 115 of the B channel track, and multiplied by the integer value, plus some margin-for-error (e.g., +10%).

The controller 702 determines (2320) whether the magnitude of the channel B rate-of-change limit $\Delta_{UB}$ for increasing the transmission rate is greater than the magnitude of the channel A rate-of-change limit $\Delta_{UA}$. If it is (2320 "Yes"), the magnitude of the peak slope $\Delta_{Uout}$ for increasing the baud while transmitting the current bit sequence is set (2322) to be less than $\Delta_{UB}$ and greater than $\Delta_{DA}$. For example, $\Delta_{Uout}$ can be set to $(|A_{UA}+A_{UB}|)/2$, such that $\Delta_{Uout}$ will be the average of $\Delta_{UA}$ and $\Delta_{UB}$. Otherwise (2320 "No"), the peak slope $\Delta_{Uout}$ for increasing the baud while transmitting the current bit sequence is set to be less than $\Delta_{UA}$ and less than $\Delta_{UB}$, such as setting $\Delta_{Uout}$ to be 75% of $\Delta_{UB}$.

The controller 702 may also determine (2330) whether the magnitude of the channel B rate-of-change limit $\Delta_{DB}$ for decreasing the transmission rate is greater than the magnitude of the channel A rate-of-change limit $\Delta_{DA}$. If it is (2330 "Yes"), the magnitude of the peak slope $\Delta_{Dout}$ for decreasing the baud while transmitting the current bit sequence is set to be less than $\Delta_{DB}$ and greater than $\Delta_{DA}$. For example, $\Delta_{Dout}$ can be set to $(\Delta_{DA}+\Delta_{DB})/2$, such that $\Delta_{Dout}$ will be the average of $\Delta_{DA}$ and $\Delta_{DB}$. Otherwise (2330 "No"), the peak slope $\Delta_{Dout}$ for decreasing the baud while transmitting the current bit sequence is set to be less than $\Delta_{DA}$ and less than $\Delta_{DB}$, such as setting $\Delta_{Dout}$ to be 75% of $|\Delta_{DB}|$.

The controller 702 sets (2340) the baud modulation to start at a first baud that is greater than the channel A and B low frequency filter cutoff-threshold limits $F_{LA}$ and $F_{LB}$, and less than the high frequency filter cutoff-thresholds limits $F_{HA}$ and $F_{HB}$. For example, the description value 612 that controls the frequency of clock signal 701 may be set to produce a first baud that is an average of $F_{LA}$, $F_{LB}$, $F_{HA}$, and $F_{HB}$, thus making the first baud compatible with both the A and B channel decoders.

The controller 702 determines (2350) whether the channel B high frequency filter limit $F_{HB}$ is greater than the corresponding limit $F_{HA}$ of channel A. If it is (2350 "Yes"), a second baud is set (2352) to be greater than $F_{HA}$ and less than $F_{HB}$, such as by averaging $F_{HA}$ and $F_{HB}$. The baud modulation for transmission of the current "B" sequence is set (2360) to increase from the first to the second baud with a peak rate of change (slope) of $\Delta_{Uout}$. The modulation is then set (2364) to maintain the second baud for a period of at least $TO_A$. Thereafter, the modulation is set (2366) to decrease from the second baud back to the first baud, with a peak rate of change (slope) of $-\Delta_{Dout}$.

The controller 702 may use a linear increase at the rates $\Delta_{Uout}$ and $-\Delta_{Dout}$ to transition from the first baud to the second baud, and from the second baud to the first baud, or execute a curve fitting algorithm. For example, to rise gradually transition from the first baud to the second baud, the controller 702 may execute a curve fitting algorithm to produce a gradual increase from the first baud to a mid-baud line segment with slope $\Delta_{Uout}$, and may reuse (rotate) the resulting curve values to produce the increase from the line segment to the second baud. Likewise, to rise gradually decrease from the second baud to the first baud, the controller 702 may execute a curve fitting algorithm to produce a gradual decrease from the second baud to a mid-baud line segment with slope $-\Delta_{Dout}$, and may reuse (rotate) the resulting curve values to produce the gradual decrease from the line segment to the first baud. The modulation values/curves are digitized to produce description signal 612.

If the controller 702 determines (2350 "No") that the channel B high frequency filter limit $F_{HB}$ is not greater than the corresponding limit $F_{HA}$ of channel A, the controller 702 determines (2354) whether the channel B low frequency filter limit $F_{LB}$ is less than the corresponding limit $F_{LA}$ of channel A. If it is (2354 "Yes"), the second baud is set (2356) to be less than $F_{LA}$ and greater than $F_{LB}$, such as by averaging $F_{LA}$ and $F_{LB}$. The baud modulation is set (2362) to decrease from the first to the second baud with a peak rate of change (slope) of $-\Delta_{Dout}$. The modulation is set (2364) to maintain the second baud for a period of at least $TO_A$. Thereafter, the modulation is set (2370) to increase from the second baud back to the first baud, with a peak rate of change (slope) of $\Delta_{Uout}$. As discussed above, controller 702 may linearly decrease (2362) and increase (2370) the baud, or may execute a curve fitting algorithm to gradually decrease (2362) and increase (2370) the baud. The modulation values/curves are quantized/digitized by the controller 702 to produce the description signal 612.

If the controller 702 determines (2354 "No") that the channel B low frequency filter limit $F_{LB}$ is not less than the corresponding limit $F_{LA}$ of channel A, the second baud is set (2358) to be greater than $F_{LA}$, greater than $F_{LB}$, less than $F_{HA}$, less $F_{HB}$, and greater than the first baud, such as by adding 75% of the difference between the value used for the first baud frequency and $F_{HB}$ to the first baud to produce the second baud. The baud modulation is set (2360) to increase from the first to the second baud with a peak rate of change (slope) of $\Delta_{U_{out}}$. Thereafter, the modulation is set (2366) to gradually decrease from the second baud back to the first baud, with a peak rate of change (slope) of $-\Delta_{D_{out}}$. As discussed above, the controller 702 may linearly increase (2360) and decrease (2364) the baud. The modulation values/curves are quantized/digitized by the controller 702 to produce the description signal 612.

In the circumstances that $\Delta_{UB}$ is not greater than $\Delta_{UA}$ (2320 "No"), $|\Delta_{DB}|$ is not greater than $|\Delta_{DA}|$ (2330 "No"), $F_{HB}$ is not greater than $F_{HA}$ (2350 "No"), and $F_{LB}$ is not less than $F_{LA}$ (2354 "No"), but $TO_B$ is longer than $TO_A$, the channel B data can made more susceptible to rejection by the channel A decoder using the technique discussed in connection with FIG. 18, if $TO_B$ is longer than $TO_A$. To use such an approach, the second bit sequence is divided into two portions, and the baud rate is increased therebetween to exceed both $F_{HA}$ and $F_{HB}$ for a period longer than $TO_A$ and shorter than $TO_B$, such as for a duration that is the average of $TO_A$ and $TO_B$. This approach may also be used when a framework calls for bit sequences for three payment card track channels, such as T3-T1R-T2R, and at least one of the various parameters ($\Delta_U$, $\Delta_D$, $F_L$, $F_H$) distinguishes the first bit sequence from one but not both of the subsequent sequences.

The method of FIG. 23 can be readily adapted to work with frameworks that call for bit sequences for three payment card track channels, such as T3-T1R-T2R. In such arrangements, at least one of the second baud, $\Delta_{U_{out}}$, and $\Delta_{D_{out}}$ is selected to distinguish the second bit sequence from the first bit sequence, and at least one is selected to distinguish the third bit sequence from the second bit sequence.

As noted above, a plurality of zeros can serve as clocking bits, preceding and/or following a track bit sequence. The device 610 applies F2F encoding to such zeros in the same manner as the track data and other bits included in the data signal 611. While the transitions between the first and second baud are discussed as being configured to take place during a bit sequence directed to a different channel than the one intended to timeout, a transition between the first and second baud can begin in such clocking bits that precede the bit sequence directed to the different channel. The controller 702 may implement the baud rate modulations by modulating, controlling, and/or generating the clock signal 601 in synchronization with the data signal 611, or by modulating the effective clock 701 by controlling the duration corresponding to each bit in the data signal 611/814.

In some frameworks, the modulation may be set to increase or decrease from the first baud to the second baud (2360, 2362) without decreasing (2366) or increasing (2370) back to the first baud. For example, in a T2-T2R-T1R, where the first bit sequence (T2) and second bit sequence (T2R) will be directed to the same MSR channel, and the third bit sequence (T1R) is directed to a different channel, then the baud applied to the first bit sequence may be the same as the second bit sequence, such as the first baud. Then, during the third bit sequence, the baud may modulate from the first baud to the second baud to trigger a timeout of the Track 2 decoder 633, but then remain at the second baud. If there is a possibility of a T2==T3 conflict, the baud rate may be modulated during the first bit sequence where the conflict might occur (e.g., T2 in T2-T2R-T1R), but can otherwise proceed in the same way.

Figure 24:
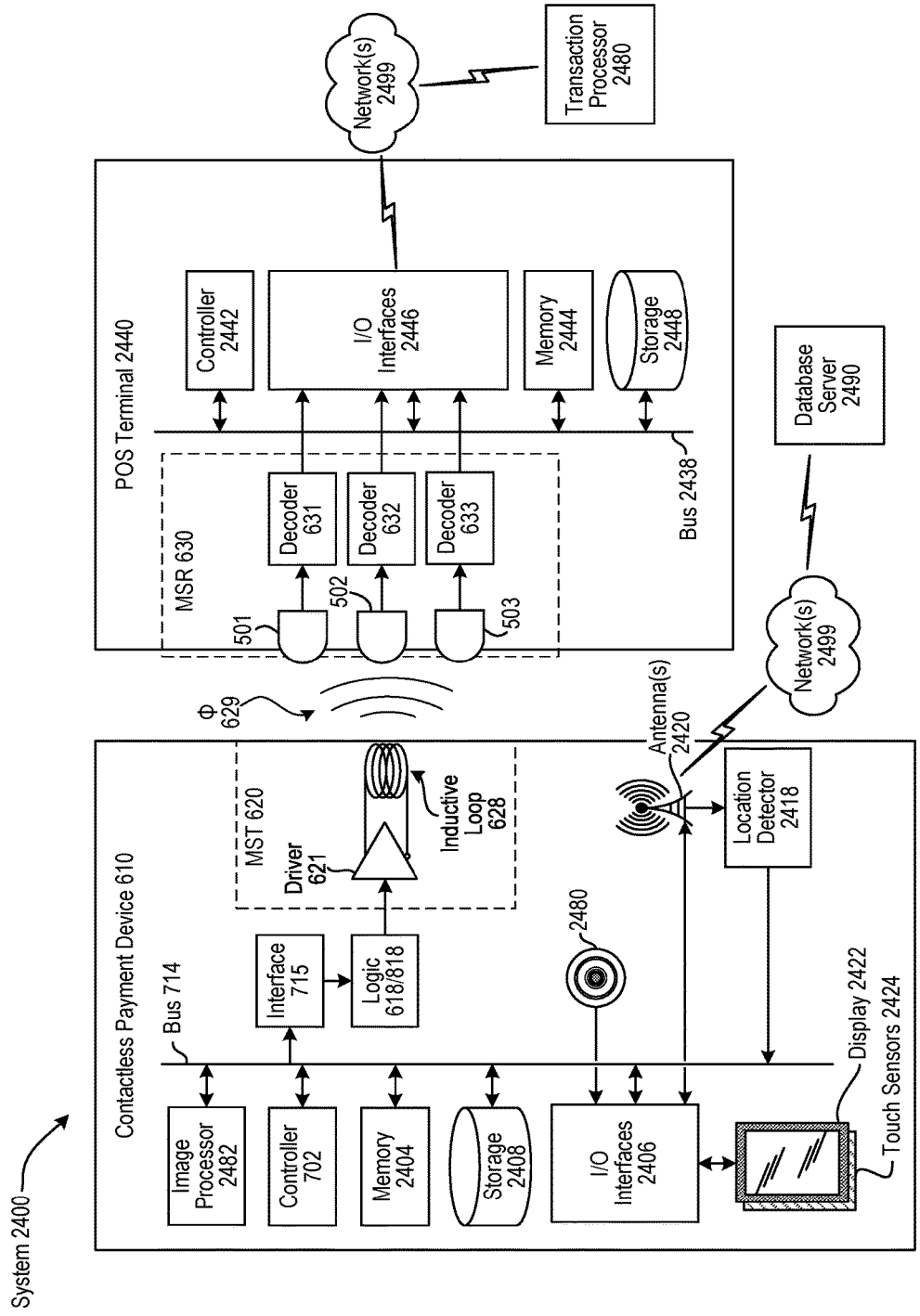
FIG. 24 is a block diagram illustrating example components in a system including the device that generates the improved pulse sequence transmission according to the system, process, and apparatus of the disclosure.

FIG. 24 is a block diagram illustrating example components in a system 2400 including the contactless payment device 610 that generates the improved pulse sequence transmission, and a POS terminal 2440 that includes the MSR 630.

A controller 702 on the device 610 executes instructions to perform the processes and output the improved pulse sequence transmissions with the variable baud rate modulations discussed in connection with FIGS. 6 to 23. This includes arranging the track data 611 into a data stream, and setting the description data 612 for the track data. This may also include executing instructions to control, generate, and/or down-convert the clock and to perform F2F encoding, if some or all of the logic 618 is integrated into the controller 702 (discussed in connection with FIG. 8). The controller 702 may include a central processing unit (CPU) for processing data and executing instructions A memory 2404 stores the instructions that are executed by the controller 702, and the data that is used and generated by those instructions. The memory 2404 may include volatile (transitory) and/or non-volatile (non-transitory) random access memory (RAM) and/or other types of memory. The device 610 also includes a data storage component 2408, for long term storage of the data and the controller-executable instructions and associated data (e.g., frameworks, look-up tables, parameter databases, rules, etc.). The data storage component 2408 comprises a non-volatile (non-transitory) storage, such as read only memory (ROM), flash memory, phase-change memory, Ferroelectric RAM (FeRAM or FRAM), etc. The device 610 may also be connected to removable or external non-volatile memory and/or storage, such as a removable memory card, a USB "thumb" drive, networked "cloud" storage, etc., through input/output (I/O) interfaces 2406.

The controller-executable instructions that configure the device 610 and its various components are executed by the controller or controllers 702, using the memory 2404 as temporary "working" storage at runtime. The controller-executable instructions may be stored in the memory 2404, the storage component 2408, and/or an external device. Some of the instructions may be embedded in hardware or firmware in addition to or instead of software.

The I/O interfaces 2406 may include interfaces for an external peripheral device connection such as universal serial bus (USB), as well as interfaces for wireless local area network (such as WiFi), Bluetooth, and/or cellular network (such as Long Term Evolution (LTE)) connectivity via the antenna(s) 2420. The I/O interfaces 2406 may also provide interfaces to a display 2422 including touch sensors 2424, and to one or more cameras 2480.

The antenna(s) may also be used by a location detector 2418, which may include one or more specialized radio receivers, such as a GPS receiver or GLONASS receiver. Instructions executed by the controller(s) 702 may determine (2112) the device's geographic location based on location information determined by the location detector 2418. Location information may be used to identify (2114) POS terminal types and/or frameworks associated with the geographic location to determine which track data is likely to be needed, so as to select (2132) a stream framework (e.g., T2-T1, T2-T1R, T1N-T2, T1-T2R, T1N-T2-T1R, T2-T1N-T2R, T2-T1R-T2R, etc.) based on what has worked successfully at or near that location before.

The device 610 may also include an image processor 2482, either as a component (e.g., a digital signal processor), or as instructions stored in storage 2408 that configure the controller 702 to perform image processing. The image processor 2482 may be used to process images captured by the one or more cameras 2480 to perform the pattern recognition (2122) to identify (2124) a POS terminal based on distinctive physical features/shape. The controller 702 may select (2132) the framework and set the description data 612 based on such recognition of the POS terminal.

In addition, the image processor 2482 may be used to identify the proximity and orientation of the POS terminal's MSR 630 based on pattern recognition. Instructions stored in storage 2408 may be used to configure the controller 702 to cause the display of information on the display 2422 instructing a user how to position the device 610 relative to the MSR 630 of the POS terminal 2440 improve the likelihood that the POS terminal 2440 will correctly receive the magnetic pulse sequence when it is emitted via the inductive loop 628. The instructions may be in the form, for example, of an augmented reality interface that displays the live image of the MSR 630 as captured by the camera 2480 on the display 2422, together with an overlay indicating whether the user should move the device up, down, closer, further, etc. relative to the MSR 630.

The device 610 may include an address/data bus 714 for conveying data among components of the device 610. Each component within the device 610 may also be directly connected to other components in addition to (or instead of) being connected to other components across the bus 714.

A list of pulse transmission sequence stream frameworks may be stored in memory 2404 and/or storage component 2408, and updated/reconciled against data stored on a database server 2490, reached via a connection over one-or-more networks 2499. The controller 702 sequentially sends the serial data 611 and the description data 612 to the logic circuit 618 in accordance with the selected stream framework, and/or may send the baud-modulated F2F-encoded signal 814 to the logic circuit 818. In response to receiving the F2F-encoded pulses over connection 619, the driver 621 applies a time-modulated alternating current to the inductive loop 628. The application of the alternating current to the loop 628 generates the magnetic pulse transmission.

The example POS terminal 2440 includes the MSR 630. As previously discussed, the MSR 630 includes two or three of the read heads 501, 502, and 503. The Track 1 channel read head 501 outputs a signal to a Track 1 channel decoder 631. The Track 2 channel read head 502 outputs a signal to a Track 2 channel decoder 632. The Track 3 channel read head 503 outputs a signal to a Track 3 channel decoder 633. It should be appreciated that other components may be implemented in various configurations in different models by different manufacturers of POS terminals. The MSR 630 may be integrated with the POS terminal 2440, or may be separate. The MSR 630 may communicate with components of the POS terminal 2440 via input/output (I/O) interfaces 2446.

The POS terminal 2440 includes a controller 2442 that includes a central processing unit (CPU) for processing data and executing instructions, and a memory 2444 that stores the data and the controller-executable instructions. The memory 2444 may include volatile random access memory (RAM) and/or other types of memory. The POS terminal 2440 also includes a data storage component 2448 that provides long-term storage of the data and the controller-executable instructions. The data storage component 2448 may include one or more non-volatile storage types such as read only memory (ROM), flash memory, a hard disk drive (HDD), etc. The POS terminal 2440 may also be connected to removable or external non-volatile memory and/or storage, such as a USB "thumb" drive, an optical disc drive, networked "cloud" storage, etc., through the I/O interfaces 2446.

The controller-executable instructions that configure the POS terminal 2440 and its various components are executed by the controller 2442, using the memory 2444 as temporary "working" storage at runtime. The controller-executable instructions may be stored in the non-volatile memory 2444, the storage component 2448, and/or an external device. Some of the instructions may be embedded in hardware or firmware in addition to or instead of software. Some or all of the functionality of the channel decoders 631, 632, and 633 may be performed by the controller 2442 instead of or in conjunction with dedicated decoder circuitry within the MSR 630.

The POS terminal 2440 may include an address/data bus 2438 for conveying data among components of the terminal 2440. Each component within the POS terminal 2440 may also be directly connected to other components in addition to (or instead of) being connected to other components across the bus 2438.

The POS terminal 2440 may use an input/output (I/O) interface 2446 to communicate with a transaction processor 2480 via network(s) 2499. Instructions executed by the controller 2442 receive the decoded pulse information from the MSR 630, extract the information needed for transaction approval, and forward at least a portion of the extracted information to the transaction processor 2480. The transaction processor 2480 sends back information indicating whether the transaction is approved or denied. The POS terminal 2440 may output an indication of whether the transaction is approved or denied, such as outputting a message via a display (not illustrated), by activating an indicator, by outputting a sound, etc.

The example stream frameworks and baud modulations disclosed herein are intended to teach the principles of how to create and transmit the improved pulse transmission sequences to one of ordinary skill, rather than to be exhaustive. Many modifications and variations may be apparent to those of skill in the art, such as changing the order of process steps, while still achieving the benefits and advantages of the improved system. For example, while several of the examples focus on the transmission of Track 1 data and Track 2 data, the operational principles apply to the transmission of any data stream that includes data for two or three tracks. Moreover, aspects of the system may be practiced without some or all of the specific details and steps disclosed herein.

For example, the programmable frequency divider 740 can be replaced by a programmable clock generator, with the description data 712 controlling the output frequency of the clock generator. A clock generator can more flexibly control the frequency of clock signal 701 than a frequency divider, such as outputting clock frequencies in equally spaced steps of 100 Hz. However, a digital frequency divider 740 can be simpler to implement, such as by flip-flops or shift registers in a digital circuit, or as programmed counters by controller 702.

The transmitter, method, and system may be used to transmit track data associated with the magnetic stripe data of debit cards, credit cards, or bitstreams from any magnetic stripe medium where different tracks of the stripe have different content and/or formats. Examples of difference between formats includes there being a difference in at least at least one of the standards (e.g., 112) associated with the tracks, the recording densities (e.g. 113) of the tracks, and the character configurations (e.g., 114) of the tracks. The disclosed methods and resulting encoding are particularly useful in systems susceptible to cross-channel leakage. As such, the disclosed methods and sequence modulations may also be adapted for use with electronic cards.

As used in this disclosure, the term "a" may include one or more items unless specifically stated otherwise. Further, the phrase "based on" is intended to mean "based at least in part on" unless specifically stated otherwise.

The matter set forth in the foregoing description and accompanying drawings is offered by way of illustration only and not as a limitation. While particular embodiments have been shown and/or described, it will be apparent to those skilled in the art that changes and modifications may be made without departing from the broader aspects of the invention. The actual scope of the protection sought is intended to be defined in the following claims when viewed in their proper perspective.

What is claimed is:

1. A contactless magnetic stripe data transmission method, comprising:
    generating a first bit sequence based on a first data associated with a first track of a magnetic stripe;
    generating a second bit sequence based on a second data associated with a second track of the magnetic stripe, the first and second tracks being different;
    driving an inductor to transmit the first bit sequence and the second bit sequence in series as magnetic pulses; and
    modulating a transmission rate of the second bit sequence, as transmitted, from a first baud to a second baud, the first and second baud being different.

2. The contactless magnetic stripe data transmission method of claim 1, wherein modulating the transmission rate from the first baud to the second baud is performed gradually over a first plurality of bits of the second bit sequence.

3. The contactless magnetic stripe data transmission method of claim 2, further comprising:
    determining a first tolerance for change in the transmission rate associated with a first channel receiver for the first data; and
    determining a second tolerance for change in the transmission rate associated with a second channel receiver for the second data,
    wherein modulating the transmission rate from the first baud to the second baud is at a rate of change having a magnitude that exceeds the first tolerance and is less than the second tolerance.

4. The contactless magnetic stripe data transmission method of claim 2, further comprising modulating the transmission rate of the second bit sequence, as transmitted, gradually from the second baud to the first baud over a second plurality of bits of the second bit sequence.

5. The contactless magnetic stripe data transmission method of claim 1, wherein modulating the transmission rate changes the transmission rate from the first baud to the second baud between two bits of the second bit sequence.

6. The contactless magnetic stripe data transmission method of claim 1, further comprising:
    determining a first passband associated with noise filtering by a first channel receiver for the first data;
    determining a second passband associated with noise filtering by a second channel receiver for the second data;
    setting the first baud to be inside the first passband and the second passband; and
    setting the second baud to be outside of the first passband and inside the second passband.

7. The contactless magnetic stripe data transmission method of claim 6, further comprising:
    determining a first tolerance of the first channel receiver for gaps in the first data; and
    maintaining the transmission rate of the second bit sequence at the second baud for a duration exceeding the first tolerance.

8. The contactless magnetic stripe data transmission method of claim 7, wherein:
    the determining of the first tolerance comprises estimating the first tolerance based on an amount of time to transmit a single character of the first data via the inductor multiplied by a non-zero integer.

9. The contactless magnetic stripe data transmission method of claim 1, further comprising:
    determining a first passband associated with noise filtering by a first channel receiver for the first data;
    determining a second passband associated with noise filtering by a second channel receiver for the second data;
    determining a first tolerance of the first channel receiver for gaps in the first data;
    determining a second tolerance of the second channel receiver for gaps in the second data;
    determining that the second tolerance is greater than the first tolerance;
    setting the first baud to be inside the first passband and the second passband;
    setting a third baud to be outside the first passband and the second passband; and
    dividing the second bit sequence into a first portion and a second portion, inserting bits-other-than-track-data therebetween,
    wherein the modulating of the transmission rate further comprises modulating the transmission rate to the third baud during transmission of the inserted bits-other-than-track-data for a duration shorter than the second tolerance, the transmission rate being outside the first passband for a continuous period exceeding the first tolerance.

10. The contactless magnetic stripe data transmission method of claim 1,
    wherein the modulating of the transmission rate of the second bit sequence comprises:
        generating a clock signal at a first frequency to transmit the second bit sequence at the first baud; and
        generating the clock signal at a second frequency to transmit the second bit sequence at the second baud, and
    wherein a duration of each bit in the second bit sequence, as transmitted, corresponds to one cycle of the clock signal.

11. A contactless magnetic stripe data transmission device comprising:
    a processor that outputs a data signal based on magnetic stripe data;
    a logic circuit and driver converting the data signal into a time-variable electric signal;
    an inductor that emits magnetic pulses in response to the time-variable electric signal; and
    a memory storing instructions to be executed by the processor to:
        generate a first bit sequence based on a first data associated with a first track of a magnetic stripe,
        generate a second bit sequence based on a second data associated with a second track of the magnetic stripe, the first and second tracks being different, drive the inductor to transmit the first bit sequence and the second bit sequence in series as magnetic pulses, and modulate a transmission rate of the second bit sequence, as transmitted, from a first baud to a second baud, the first and second baud being different.

12. The contactless magnetic stripe data transmission device of claim 11, wherein the instructions to modulate the transmission rate include instructions to transition gradually from the first baud to the second baud over a plurality of bits of the second bit sequence.

13. The contactless magnetic stripe data transmission device of claim 12,
wherein the instructions further comprise instructions to:
determine a first tolerance for change in the transmission rate associated with a first channel receiver for the first data, and
determine a second tolerance for change in the transmission rate associated with a second channel receiver for the second data, and
wherein the instructions to modulate the transmission rate include instructions to control a rate of change of the transmission rate to have a magnitude that exceeds the first tolerance and is less than the second tolerance.

14. The contactless magnetic stripe data transmission device of claim 12, wherein the instructions further comprise instructions to:
modulate the transmission rate of the second bit sequence, as transmitted, gradually from the second baud to the first baud over a second plurality of bits of the second bit sequence.

15. The contactless magnetic stripe data transmission device of claim 11, wherein the instructions to modulate the transmission rate change the transmission rate from the first baud to the second baud between two bits of the second bit sequence.

16. The contactless magnetic stripe data transmission device of claim 11, wherein the instructions further comprise instructions to:
determine a first passband associated with noise filtering by a first channel receiver for the first data,
determine a second passband associated with noise filtering by a second channel receiver for the second data,
set the first baud to be inside the first passband and the second passband, and
set the second baud to be outside of the first passband and inside the second passband.

17. The contactless magnetic stripe data transmission device of claim 16, wherein the instructions further comprise instructions to:
determine a first tolerance of the first channel receiver for gaps in the first data, and
maintain the transmission rate of the second bit sequence at the second baud for a duration exceeding the first tolerance.

18. The contactless magnetic stripe data transmission device of claim 17, wherein the instructions to determine the first tolerance include instructions to estimate the first tolerance based on an amount of time to transmit a single character of the first data via the inductor multiplied by a non-zero integer.

19. The contactless magnetic stripe data transmission device of claim 11,
wherein the instructions further comprise instructions to:
determine a first passband associated with noise filtering by a first channel receiver for the first data,
determine a second passband associated with noise filtering by a second channel receiver for the second data,
determine a first tolerance of the first channel receiver for gaps in the first data,
determine a second tolerance of the second channel receiver for gaps in the second data,
determine that the second tolerance is greater than the first tolerance,
set the first baud to be inside the first passband and the second passband,
set a third baud to be outside the first passband and the second passband, and
divide the second bit sequence into a first portion and a second portion, and insert bits-other-than-track-data therebetween, and
wherein the instructions to modulate the transmission rate further comprise instructions to modulate the transmission rate to the third baud during transmission of the inserted bits-other-than-track-data for a duration shorter than the second tolerance, the transmission rate being outside the first passband for a continuous period exceeding the first tolerance.

20. The contactless magnetic stripe data transmission device of claim 11,
wherein the instructions to modulate the transmission rate include instructions to:
generate a clock signal at a first frequency to transmit the second bit sequence at the first baud, and
generate the clock signal at a second frequency to transmit the second bit sequence at the second baud, and
wherein a duration of each bit in the second bit sequence, as transmitted, corresponds to one cycle of the clock signal.

* * * * *